(12) United States Patent  
Tanaka et al.

(10) Patent No.: US 7,946,030 B2  
(45) Date of Patent: May 24, 2011

(54) APPARATUS FOR ASSEMBLING COMPONENTS ON A TARGET OBJECT UTILIZING A SLIDER FOR MOVEMENT OF A PALLET

(75) Inventors: Toshiharu Tanaka, Tokyo (JP); Yoshitaka Taniguchi, Tokyo (JP)

(73) Assignee: Hirata Corporation (JP)

( * ) Notice: Subject to any disclaimer, the term of this patent is extended or adjusted under 35 U.S.C. 154(b) by 53 days.

(21) Appl. No.: 11/990,331

(22) PCT Filed: Oct. 26, 2005

(86) PCT No.: PCT/JP2005/019671  
§ 371 (c)(1),  
(2), (4) Date: Feb. 24, 2009

(87) PCT Pub. No.: WO2007/049341  
PCT Pub. Date: May 3, 2007

(65) Prior Publication Data  
US 2009/0300904 A1  Dec. 10, 2009

(51) Int. Cl.  
*B23P 21/00* (2006.01)

(52) U.S. Cl. ............... 29/784; 29/711; 29/721; 29/787; 29/729; 29/33 P

(58) Field of Classification Search ............ 29/729, 29/739, 701, 407.04, 784–789, 705–711, 29/719–722; 414/737, 752.1; 901/15; 198/465.2  
See application file for complete search history.

(56) References Cited

U.S. PATENT DOCUMENTS

| | | | | |
|---|---|---|---|---|
| 4,783,904 A * | 11/1988 | Kimura | ........................ | 29/786 |
| 4,823,929 A * | 4/1989 | Fleming et al. | ............ | 198/345.3 |
| 5,079,829 A * | 1/1992 | Yoshiji et al. | ................... | 483/14 |
| 5,319,845 A * | 6/1994 | Watanabe et al. | ................ | 29/701 |
| 5,576,513 A * | 11/1996 | Gunther et al. | ............... | 174/372 |
| 5,617,625 A * | 4/1997 | Esaki et al. | .................... | 29/430 |
| 5,680,694 A * | 10/1997 | Best | .............................. | 29/701 |
| 6,163,946 A * | 12/2000 | Pryor | ........................ | 29/407.04 |
| 6,519,827 B1 * | 2/2003 | Hayashi et al. | ................ | 29/430 |
| 7,526,858 B2 * | 5/2009 | Kasuga et al. | .................. | 29/729 |

FOREIGN PATENT DOCUMENTS

| | | |
|---|---|---|
| JP | 56-39844 | 4/1981 |
| JP | 63-295128 | 1/1988 |
| JP | 05-084676 | 6/1993 |
| JP | 7-287362 | 1/1995 |
| JP | 10-6152 | 1/1998 |
| JP | 2001-156497 | 6/2001 |
| JP | 2002-326127 | 12/2002 |

* cited by examiner

*Primary Examiner* — Minh Trinh  
(74) *Attorney, Agent, or Firm* — Bacon & Thomas, PLLC

(57) ABSTRACT

An assembly-target-object-and-assembly-component carrier pallet carries thereon a target object (semi-finished product) 2 and a plurality of assembly components arranged, as viewed in plane, on a straight line which passes through a predetermined attachment position on the target object where the predetermined assembly component is to be attached. This allows a minimum of moving parts in the attaching device which attaches the assembly components to the assembly target object. Therefore, the structure of an assembling apparatus is simplified and mechanical errors and assembly time are reduced, thereby improving assembling accuracy.

4 Claims, 13 Drawing Sheets

(1) VACUUM-CHUCKING LAMP AND LAMP SCREW (2) RAISING HOLDING HAND (3) POSITIONING PALLET (TO LAMP-ATTACHING POSITION)

(4) LOWERING HOLDING HAND AND ATTACHING LAMP (5) FASTENING SCREW

APPARATUS FOR ASSEMBLING COMPONENTS ON A TARGET OBJECT UTILIZING A SLIDER FOR MOVEMENT OF A PALLET

TECHNICAL FIELD

The present invention relates to an assembly-target-object-and-assembly-component carrier pallet used to carry thereon an assembly target object and a plurality of assembly components required for assembly when a small-sized precision product, such as an electronic component, is assembled, and to an assembling apparatus including the assembly-target-object-and-assembly-component carrier pallet and adapted to assemble a small-sized precision product.

BACKGROUND ART

Conventionally, the assembly of a small-sized precision product, such as an electronic component, requires precision assembling work, since the product uses very small components. In such precision assembling work, for highly accurate assembly, an assembly target object (an intermediate product to which a component(s) is to be attached) and an assembly component (usually, a plurality of assembly components) which are placed on an assembly-target-object-and-assembly-component carrier pallet are led into an assembly section (an assembling station) by use of NC equipment and optical sensors; are transferred to a predetermined positioning apparatus; and are then assembled accurately (Patent Document 1).

In order to cut down an equipment installation space and the cost of equipment, an improved assembling system was proposed (Patent Document 2). In this system, an assembly target object and assembly components required for assembly are placed on a carrier pallet. When the carrier pallet comes to each of assembling stations, a transfer apparatus unloads, from the carrier pallet, an assembly target object placed at a predetermined position on the carrier pallet and positions the assembly target object at a predetermined position at the assembling station. Next, the transfer apparatus unloads, from the carrier pallet, an assembly component placed at a predetermined position on the carrier pallet and attaches the assembly component to a predetermined attachment position on the assembly target object, which has been positioned at the predetermined position at the assembling station. Upon completion of attaching all of the assembly components to the assembly target object in the aforementioned manner, the assembly target object (product) is returned back to the predetermined position on the carrier pallet and is sent to the next step.

Another assembling system (Patent Document 3) is configured as follows. At a component supply station, an assembly target object and a plurality of assembly components of different kinds required for assembly are placed on a carrier pallet. At an assembling station, a robot attaches the assembly components to the assembly target object. When a product model is changed, component holding jigs, which are removably held on the carrier pallet, are replaced as appropriate according to assembly components of a new product model. Then, assembling work is carried out in a similar manner.

Patent Document 1: Japanese Patent Application Laid-Open (kokai) No. S63-295128
Patent Document 2: Japanese Patent Application Laid-Open (kokai) No. H05-084676
Patent Document 3: Japanese Patent Application Laid-Open (kokai) No. 2002-326127

However, according to the assembling systems described in Patent Documents 1 and 2, an assembly target object and assembly components are led to assembling stations so as to undergo assembling work. This requires a wide space for installation of equipment and apparatus required for assembling work. Also, much time is consumed in transferring the assembly target object and assembly components to the assembling stations, resulting in inefficiency.

Further, according to the assembling system described in Patent Document 3, a robot carries out attachment of a plurality of assembly components of different kinds at a single assembling station. This renders complex the structure of a holder head of the robot for holding an assembly component, control of the robot, and the configuration of peripheral accessory apparatus. Additionally, when a transfer motion in plane is involved, a moving mechanism for movement in plane is required. This involves the accumulation of mechanical errors of the moving mechanism, resulting in impairment in accuracy in attaching assembly components to an assembly target object. Thus, an error in attachment is apt to arise.

DISCLOSURE OF THE INVENTION

Problems to be Solved by the Invention

The present invention has been achieved for solving the above-mentioned problems in the conventional assembly-target-object-and-assembly-component carrier pallet and assembling apparatus for use in assembling a small-sized precision product, such as an electronic component. The present invention minimizes the size of the moving mechanism of an attaching device, which attaches an assembly component to an assembly target object, so as to simplify the structure of an assembling apparatus to thereby reduce the cost of equipment, and reduces the time required for transfer of an assembly component to thereby improve work efficiency. The present invention also reduces the mechanical error of the moving mechanism so as to improve accuracy in attaching assembly components to the assembly target object, thereby improving the assembling accuracy of a product and thus enabling the accurate assembly of even a small component. An object of the present invention is to provide an assembly-target-object-and-assembly-component carrier pallet and an assembly apparatus which can implement the above-mentioned effects.

Means for Solving the Problems

According to the present invention, the following assembly-target-object-and-assembly-component carrier pallet and assembling apparatus solve the above-mentioned problems.

The present invention provides an assembly-target-object-and-assembly-component carrier pallet used to carry thereon an assembly target object and a plurality of assembly components required for assembly when a small-sized precision product, such as an electronic component, is assembled. In the assembly-target-object-and-assembly-component carrier pallet, a placement position of the assembly target object on the assembly-target-object-and-assembly-component carrier pallet and placement positions of the assembly components on the assembly-target-object-and-assembly-component carrier pallet are in such a relation that, as viewed in plane, the placement position of a predetermined assembly component among the assembly components on the assembly-target-object-and-assembly-component carrier pallet is on a straight line which passes through a predetermined attachment position on the assembly target object where the predetermined assembly component is to be attached, and which is oriented in a predetermined direction.

According to the assembly-target-object-and-assembly-component carrier pallet, in attaching the predetermined assembly component placed on the assembly-target-object-and-assembly-component carrier pallet to the predetermined attachment position on the assembly target object placed on the carrier pallet, the transfer motion is carried out as follows. The assembly component is unloaded from the assembly-target-object-and-assembly-component carrier pallet and is then raised. Next, as viewed in plane, the assembly component undergoes relative movement in relation to the carrier pallet to the predetermined attachment position on the assembly target object along the straight line which passes through the attachment position and which is oriented in the predetermined direction. Then, the assembly component is lowered to the attachment position. Therefore, the moving mechanism of an assembling apparatus can be configured in a minimum necessary manner.

Thus, the structure of the assembling apparatus can be simplified, whereby the cost of equipment can be reduced. Also, time required for transfer of the assembly component can be reduced, whereby work efficiency can be improved. Further, since the motion in plane of each of operating devices required for assembly is designed so that each of the operating devices can carry out assembling work by means of a single operating mechanism, the accumulation of mechanical errors of the operating devices can be minimized. Thus, the mechanical error of the moving mechanism can be reduced, thereby improving accuracy in attaching the assembly components to the assembly target object and thus improving the assembling accuracy of a product. Therefore, even small assembly components can be assembled accurately.

The present invention further provides an assembling apparatus comprising the above-mentioned assembly-target-object-and-assembly-component carrier pallet; a conveying apparatus; and at least one assembling means. In the assembling apparatus, the conveying apparatus conveys the assembly-target-object-and-assembly-component carrier pallet along the predetermined direction, and the assembling means unloads the predetermined assembly component from the assembly-target-object-and-assembly-component carrier pallet and raises and lowers the predetermined assembly component so as to attach the predetermined assembly component to the predetermined attachment position on the assembly target object.

This assembling apparatus can yield those effects which the above-mentioned assembly-target-object-and-assembly-component carrier pallet yields. The assembling means of the assembling apparatus moves the predetermined assembly component in the vertical direction only, while holding the assembly component, and does not move the assembly component in plane. Therefore, the mechanical error can be further reduced. This can further improve accuracy in attaching the assembly components to the assembly target object, so that the assembling accuracy of a product can be further improved.

According to a preferred embodiment, in the assembling apparatus, the conveying apparatus includes at least one pallet-positioning-holding means for positioning and holding the assembly-target-object-and-assembly-component carrier pallet at predetermined stop positions, and the predetermined stop positions of the assembly-target-object-and-assembly-component carrier pallet include a position where the assembling means unloads the predetermined assembly component from the assembly-target-object-and-assembly-component carrier pallet and raises the predetermined assembly component, and a position where the assembling means lowers the raised, predetermined assembly component and attaches the predetermined assembly component to the predetermined attachment position on the assembly target object.

Thus, the assembling means can accurately hold (unload) and attach the assembly component. Further, even small assembly components can be assembled with high accuracy.

According to another preferred embodiment, in the assembling apparatus, the conveying apparatus includes at least one pallet-positioning-holding means for positioning and holding the assembly-target-object-and-assembly-component carrier pallet at a predetermined stop position; the assembling means includes an assembling-means-moving mechanism; the predetermined stop position of the assembly-target-object-and-assembly-component carrier pallet is a position where the assembling means unloads the predetermined assembly component from the assembly-target-object-and-assembly-component carrier pallet and raises the predetermined assembly component; and, while the assembly-target-object-and-assembly-component carrier pallet is in a quiescent state, the assembling-means-moving mechanism moves the assembling means from the predetermined stop position of the assembly-target-object-and-assembly-component carrier pallet to a position where the assembling means lowers the raised, predetermined assembly component and attaches the predetermined assembly component to the predetermined attachment position on the assembly target object.

Although the assembling means involves an additional horizontal movement, the assembly-target-object-and-assembly-component carrier pallet does not need to move; therefore, movement in plane is substantially of the assembling means only. Thus, the assembling means can accurately hold (unload) and attach the assembly component, thereby maintaining the mechanical error at a reduced level. Further, even small assembly components can be assembled with high accuracy.

The present invention further provides an assembly-target-object-and-assembly-component carrier pallet used to carry thereon an assembly target object and a plurality of assembly components required for assembly when a small-sized precision product, such as an electronic component, is assembled, comprising an assembly-target-object carrier subpallet and an assembly-component carrier subpallet. In the assembly-target-object-and-assembly-component carrier pallet, the assembly-target-object carrier subpallet carries the assembly target object thereon; the assembly-component carrier subpallet carries the assembly components thereon; a placement position of the assembly target object on the assembly-target-object carrier subpallet and placement positions of the assembly components on the assembly-component carrier subpallet are in such a relation that, as viewed in plane, the placement position of a predetermined assembly component among the assembly components on the assembly-component carrier subpallet is on a straight line which passes through a predetermined attachment position on the assembly target object where the predetermined assembly component is to be attached, and which is oriented in a predetermined direction.

According to the assembly-target-object-and-assembly-component carrier pallet, in attaching the predetermined assembly component placed on the assembly-component carrier subpallet to the predetermined attachment position on the assembly target object placed on the assembly-target-object carrier subpallet, the transfer motion is carried out as follows. The assembly component is unloaded from the assembly-component carrier subpallet and is then raised. Next, as viewed in plane, the assembly component undergoes relative movement in relation to the both carrier subpallets to the predetermined attachment position on the assembly target object along the straight line which passes through the attachment position and which is oriented in the predetermined direction. Then, the assembly component is lowered to the attachment position. Therefore, the moving mechanism of an assembling apparatus can be configured in a minimum necessary manner.

Thus, the structure of the assembling apparatus can be simplified, whereby the cost of equipment can be reduced. Also, time required for transfer of the assembly component can be reduced, whereby work efficiency can be improved. Further, the mechanical error of the moving mechanism can be reduced, thereby improving accuracy in attaching the assembly components to the assembly target object and thus improving the assembling accuracy of a product. Therefore, even small assembly components can be assembled accurately.

Further, the assembly-target-object-and-assembly-component carrier pallet is divided into two carrier subpallets; namely, the assembly-target-object carrier subpallet and the assembly-component carrier subpallet. Therefore, a change in specifications of a product, an increase in components, etc. can be flexibly coped with.

The present invention further provides an assembling apparatus comprising the above-mentioned assembly-target-object-and-assembly-component carrier pallet; a conveying apparatus; and at least one assembling means. In the assembling apparatus, the conveying apparatus conveys the assembly-target-object carrier subpallet and the assembly-component carrier subpallet along the predetermined direction, and the assembling means unloads the predetermined assembly component from the assembly-component carrier subpallet and raises and lowers the predetermined assembly component so as to attach the predetermined assembly component to the predetermined attachment position on the assembly target object.

This assembling apparatus can yield those effects which the above-mentioned assembly-target-object-and-assembly-component carrier pallet yields. The assembling means of the assembling apparatus holds the predetermined assembly component and merely moves the predetermined assembly component vertically. Therefore, the mechanical error can be further reduced. This can further improve accuracy in attaching the assembly components to the assembly target object, so that the assembling accuracy of a product can be further improved.

According to a preferred embodiment, in the assembling apparatus, the conveying apparatus includes a plurality of pallet-positioning-holding means for positioning and holding the assembly-target-object carrier subpallet and the assembly-component carrier subpallet at predetermined stop positions, respectively; the predetermined stop position of the assembly-component carrier subpallet is a position where the assembling means unloads the predetermined assembly component from the assembly-component carrier subpallet and raises the predetermined assembly component; and the predetermined stop position of the assembly-target-object carrier subpallet is a position where the assembling means lowers the raised, predetermined assembly component and attaches the predetermined assembly component to the predetermined attachment position on the assembly target object.

Thus, the assembling means can accurately hold (unload) and attach the assembly component. Further, even small assembly components can be assembled with high accuracy.

According to another preferred embodiment, in the assembling apparatus, the conveying apparatus includes a plurality of pallet-positioning-holding means for positioning and holding the assembly-target-object carrier subpallet and the assembly-component carrier subpallet at predetermined stop positions, respectively; the assembling means includes an assembling-means-moving mechanism; the predetermined stop position of the assembly-component carrier subpallet is a position where the assembling means unloads the predetermined assembly component from the assembly-component carrier subpallet and raises the predetermined assembly component; the predetermined stop position of the assembly-target-object carrier subpallet is a position where the assembling means lowers the raised, predetermined assembly component and attaches the predetermined assembly component to the predetermined attachment position on the assembly target object; and, while the assembly-component carrier subpallet and the assembly-target-object carrier subpallet are in a quiescent state, the assembling-means-moving mechanism moves the assembling means from the predetermined stop position of the assembly-component carrier subpallet to the predetermined stop position of the assembly-target-object carrier subpallet.

Although the assembling means involves an additional horizontal movement, the assembling means can accurately hold (unload) and attach the assembly component, thereby maintaining the mechanical error at a reduced level. Further, even small assembly components can be assembled with high accuracy.

The present invention further provides an assembling apparatus comprising an assembly-target-object carrier pallet used to carry thereon an assembly target object required for assembly when a small-sized precision product, such as an electronic component, is assembled; a conveying apparatus for conveying the assembly-target-object carrier pallet; at least one assembly-component supply means used to supply at least one predetermined assembly component required for assembly; and at least one assembling means. In the assembling apparatus, a placement position of the assembly target object on the assembly-target-object carrier pallet and a supply destination position of the assembly component supplied by the assembly-component supply means are in such a relation that, as viewed in plane, the supply destination position of the predetermined assembly component is on a straight line which passes through a predetermined attachment position on the assembly target object where the predetermined assembly component is to be attached, and which is oriented in a predetermined direction.

According to the assembling apparatus, in attaching the predetermined assembly component supplied by the assembly-component supply means to the predetermined attachment position on the assembly target object placed on the assembly-target-object carrier pallet, the transfer motion is carried out as follows. The assembly component is unloaded from the assembly-component supply means and is then raised. Next, as viewed in plane, the assembly component undergoes relative movement in relation to the carrier pallet to the predetermined attachment position on the assembly target object along the straight line which passes through the attachment position and which is oriented in the predetermined direction. Then, the assembly component is lowered to the attachment position. Therefore, the moving mechanism of the assembling apparatus can be configured in a minimum necessary manner.

Thus, the structure of the assembling apparatus can be simplified, whereby the cost of equipment can be reduced. Also, time required for transfer of the assembly component can be reduced, whereby work efficiency can be improved. Further, each device has one moving mechanism for movement in plane. Thus, the mechanical error of the moving mechanism of each device can be reduced, thereby improving accuracy in attaching the assembly component to the assembly target object, and thus improving the assembling accuracy of a product. Therefore, even small assembly components can be assembled accurately.

By virtue of provision of the assembly-component supply means, a change in specifications of a product, an increase/reduction in components, etc. can be flexibly coped with.

According to a preferred embodiment, in the assembling apparatus, the assembly-component supply means supplies at least one assembly component from a direction perpendicular to or substantially perpendicular to the predetermined direction; the conveying apparatus conveys the assembly-target-object carrier pallet along the predetermined direction; and the assembling means unloads, from the assembly-component supply means, the predetermined assembly component supplied by the assembly-component supply means and raises and lowers the predetermined assembly component so as to attach the predetermined assembly component to the predetermined attachment position on the assembly target object.

Thus, the assembly-component supply means and the conveying apparatus are arranged such that the direction of supplying the assembly component and the direction of conveying the assembly target object are perpendicular to or substantially perpendicular to each other. Therefore, the structural arrangement of the assembling apparatus can be simplified.

According to another preferred embodiment, in the assembling apparatus, the assembly-component supply means includes a swivel bar having, at its opposite ends, respective component carrier portions; the swivel bar swivels intermittently by predetermined angles in a horizontal plane so as to supply the at least one assembly component one piece at a time; the conveying apparatus conveys the assembly-target-object carrier pallet along the predetermined direction; and the assembling means unloads, from the assembly-component supply means, the predetermined assembly component supplied by the assembly-component supply means and raises and lowers the predetermined assembly component so as to attach the predetermined assembly component to the predetermined attachment position on the assembly target object.

Thus, the motion of the assembly-component supply means is merely a unidirectional motion along the swiveling direction of the swivel bar, so that the structure and control of the assembly-component supply means can be simplified.

According to a further embodiment, in the assembling apparatus, the conveying apparatus includes at least one pallet-positioning-holding means for positioning and holding the assembly-target-object carrier pallet at a predetermined stop position, and the predetermined stop position of the assembly-target-object carrier pallet is a position where the assembling means lowers the raised, predetermined assembly component and attaches the predetermined assembly component to the predetermined attachment position on the assembly target object.

Thus, the assembling means can accurately attach the assembly component. Further, even small assembly components can be assembled with high accuracy.

According to a further embodiment, in the assembling apparatus, the conveying apparatus conveys the assembly-target-object carrier pallet along the predetermined direction and includes at least one pallet-positioning-holding means for positioning and holding the assembly-target-object carrier pallet at a predetermined stop position; the assembling means unloads, from the assembly-component supply means, the predetermined assembly component supplied by the assembly-component supply means and raises and lowers the predetermined assembly component so as to attach the predetermined assembly component to the predetermined attachment position on the assembly target object, and includes an assembling-means-moving mechanism; the predetermined stop position of the assembly-target-object carrier pallet is a position where the assembling means lowers the raised, predetermined assembly component and attaches the predetermined assembly component to the predetermined attachment position on the assembly target object; and, while the assembly-target-object carrier pallet is in a quiescent state, the assembling-means-moving mechanism moves the assembling means from the supply destination position of the predetermined assembly component to the predetermined stop position of the assembly-target-object carrier pallet.

Thus, for transfer of the assembly component to the attachment position, the assembling means moves from the supply destination position of the assembly component (unloading position of the assembly component) to the predetermined stop position of the assembly-target-object carrier pallet (attachment position of the assembly component) along a common straight line. This can further improve work efficiency.

Further, since the conveying apparatus includes at least one pallet-positioning-holding means for positioning and holding the assembly-target-object carrier pallet at the predetermined stop position, the assembling means can accurately attach the assembly component. Also, even small assembly components can be assembled with high accuracy.

According to a further embodiment, in the assembling apparatus, operation of the conveying apparatus is numerically controlled.

Thus, a conveying mechanism itself has a positioning function, so that the cost of equipment can be reduced. Also, an unnecessary motion is not involved, so that the work efficiency of assembly can be improved.

According to a further embodiment, the assembling apparatus further comprises atmospheric cleaning means for maintaining a region where the assembling means carries out assembling work, in a clean atmosphere.

Thus, the region where the assembling means carries out assembling work is maintained in a clean atmosphere at all times. This enables even assembling of small components, which would otherwise be adversely affected by dust. Since the moving mechanism of an attaching device is configured in a minimum necessary manner, the clean atmosphere which is maintained at all times in the region where the assembling means carries out assembling work is not broken. Therefore, assembling of small components, which would otherwise be adversely affected by dust, can be performed continuously.

Effects of the Invention

As mentioned above, according to the assembly-target-object-and-assembly-component carrier pallet of the present invention, in attaching the predetermined assembly component placed on the assembly-target-object-and-assembly-component carrier pallet to the predetermined attachment position on the assembly target object placed on the carrier pallet, the associated transfer motion is carried out as follows. The assembly component is unloaded from the assembly-target-object-and-assembly-component carrier pallet and is then raised. Next, as viewed in plane, the assembly component undergoes relative movement in relation to the carrier pallet to the predetermined attachment position on the assembly target object along the straight line which passes through the attachment position and which is oriented in the predetermined direction. Then, the assembly component is lowered to the attachment position. Therefore, the moving mechanism of an assembling apparatus can be configured in a minimum necessary manner.

Thus, the structure of the assembling apparatus can be simplified, whereby the cost of equipment can be reduced. Also, time required for transfer of the assembly component can be reduced, whereby work efficiency can be improved. Further, since the motion in plane of each of operating devices required for assembly is designed so that each of the operating devices can carry out assembling work by means of a single operating mechanism, the accumulation of mechanical errors of the operating devices can be minimized. Thus, the mechanical error of the moving mechanism can be reduced, thereby improving accuracy in attaching the assembly components to the assembly target object and thus improving the assembling accuracy of a product. Therefore, even small assembly components can be assembled accurately.

The assembling apparatus comprises the above-mentioned assembly-target-object-and-assembly-component carrier pallet; a conveying apparatus; and at least one assembling means. In the assembling apparatus, the conveying apparatus conveys the assembly-target-object-and-assembly-component carrier pallet along the predetermined direction, and the assembling means unloads the predetermined assembly component from the assembly-target-object-and-assembly-component carrier pallet and raises and lowers the predetermined assembly component so as to attach the predetermined assembly component to the predetermined attachment position on the assembly target object. Thus, the assembling apparatus can yield those effects which the above-mentioned assembly-target-object-and-assembly-component carrier pallet yields. The transfer motion of the assembling means of the assembling apparatus involves only vertical movement, performed while holding the predetermined assembly component, and does not involve movement in plane. Therefore, the mechanical error can be further reduced. This can further improve accuracy in attaching the assembly components to the assembly target object, so that the assembling accuracy of a product can be further improved.

The effect mentioned below is yielded in the case where the conveying apparatus includes at least one pallet-positioning-holding means for positioning and holding the assembly-target-object-and-assembly-component carrier pallet at predetermined stop positions, and the predetermined stop positions of the assembly-target-object-and-assembly-component carrier pallet include a position where the assembling means unloads the predetermined assembly component from the assembly-target-object-and-assembly-component carrier pallet and raises the predetermined assembly component, and a position where the assembling means lowers the raised, predetermined assembly component and attaches the predetermined assembly component to the predetermined attachment position on the assembly target object. The assembling means can accurately hold (unload) and attach the assembly component. Further, even small assembly components can be assembled with high accuracy.

Further, the effect mentioned below is yielded in the case where the conveying apparatus includes at least one pallet-positioning-holding means for positioning and holding the assembly-target-object-and-assembly-component carrier pallet at a predetermined stop position; the assembling means includes an assembling-means-moving mechanism; the predetermined stop position of the assembly-target-object-and-assembly-component carrier pallet is a position where the assembling means unloads the predetermined assembly component from the assembly-target-object-and-assembly-component carrier pallet and raises the predetermined assembly component; and, while the assembly-target-object-and-assembly-component carrier pallet is in a quiescent state, the assembling-means-moving mechanism moves the assembling means from the predetermined stop position of the assembly-target-object-and-assembly-component carrier pallet to a position where the assembling means lowers the raised, predetermined assembly component and attaches the predetermined assembly component to the predetermined attachment position on the assembly target object. Although the assembling means involves an additional horizontal movement, the assembly-target-object-and-assembly-component carrier pallet does not need to move; therefore, movement in plane is substantially of the assembling means only. Thus, as in the above case, the assembling means can accurately hold (unload) and attach the assembly component, thereby maintaining the mechanical error at a reduced level. Further, even small assembly components can be assembled with high accuracy.

Additionally, the aforementioned various effects can be yielded.

DESCRIPTION OF REFERENCE NUMERALS

Figure 1:
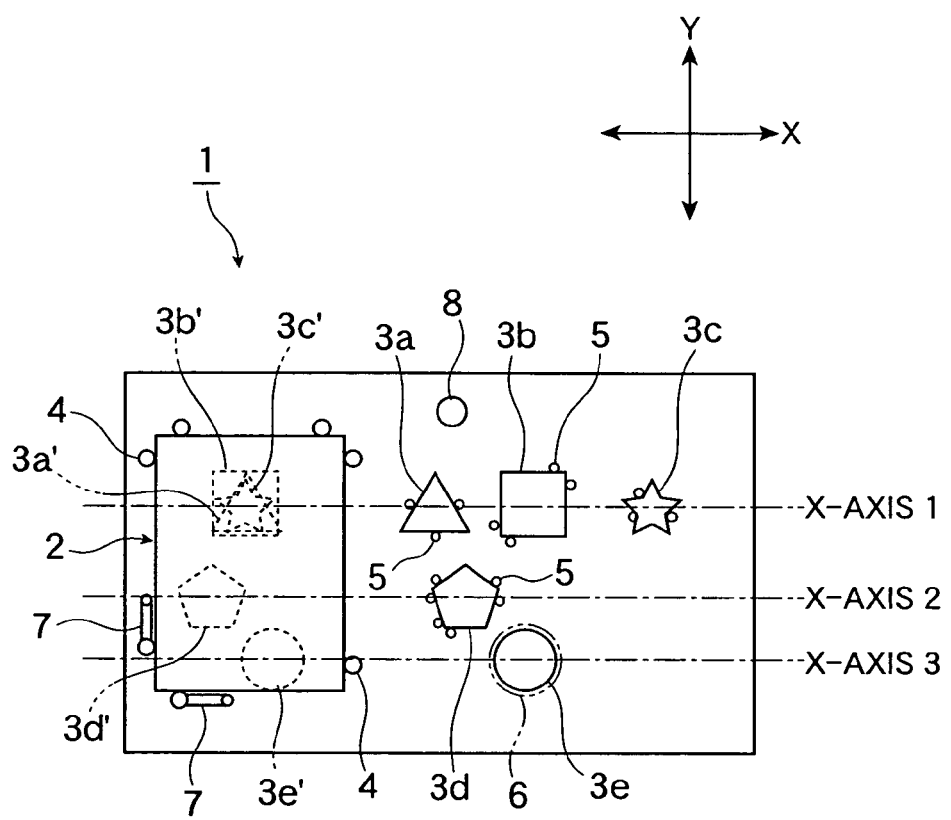
FIG. 1 is a plan view of an assembly-target-object-and-assembly-component carrier pallet according to an embodiment (Embodiment 1) of the present invention.

1: assembly-target-object-and-assembly-component carrier pallet; 1A: assembly-target-object carrier subpallet; 1B: assembly-component carrier subpallet; 1C: assembly-target-object carrier pallet; 2: assembly target object; 3a to 3e: assembly component; 4, 5: positioning pin; 6: positioning ring; 7: pressing lever; 8, 9: positioning pin; 10: assembling apparatus; 20: base frame; 30: conveying apparatus; 31-1 to 31-4, 32-1 to 32-4: pallet-positioning-holding means; 40-1 to 40-4: assembling means; 41-1 to 41-4: support stand; 42-1 to 42-4: arm; 43-1, 43-2 (43-2b, 43-2e), 43-3, 43-4: holding hand; 44-1 to 44-4: assembling-means-moving mechanism; 50-1 to 50-4: assembly-component supply means; 51-1 to 51-4: slider; 52-1 to 52-4: component carrier portion; 53-1 to 53-4: swivel bar; 54-1a, 54-1b to 54-4a, 54-4b: component carrier portion

BEST MODE FOR CARRYING OUT THE INVENTION

In an assembly-target-object-and-assembly-component carrier pallet used to carry thereon an assembly target object and a plurality of assembly components required for assembly when a small-sized precision product, such as an electronic component, is assembled, the placement position of the assembly target object on the assembly-target-object-and-assembly-component carrier pallet and the placement positions of the assembly components on the assembly-target-object-and-assembly-component carrier pallet are in such a relation that, as viewed in plane, the placement position of a predetermined assembly component among the assembly components on the assembly-target-object-and-assembly-component carrier pallet is on a straight line which passes through a predetermined attachment position on the assembly target object where the predetermined assembly component is to be attached, and which is oriented in a predetermined direction.

An assembling apparatus includes the above-mentioned assembly-target-object-and-assembly-component carrier pallet; a conveying apparatus; and at least one assembling means. In the assembling apparatus, the conveying apparatus conveys the assembly-target-object-and-assembly-component carrier pallet along the predetermined direction, and the assembling means unloads the predetermined assembly component from the assembly-target-object-and-assembly-component carrier pallet and raises and lowers the predetermined assembly component so as to attach the predetermined assembly component to the predetermined attachment position on the assembly target object.

In this case, the conveying apparatus includes at least one pallet-positioning-holding means for positioning and holding the assembly-target-object-and-assembly-component carrier pallet at predetermined stop positions, and the predetermined stop positions of the assembly-target-object-and-assembly-component carrier pallet include a position where the assembling means unloads the predetermined assembly component from the assembly-target-object-and-assembly-component carrier pallet and raises the predetermined assembly component, and a position where the assembling means lowers the raised, predetermined assembly component and attaches the predetermined assembly component to the predetermined attachment position on the assembly target object.

Embodiment 1

Next, an embodiment (Embodiment 1) of the present invention will be described.

Figure 2:
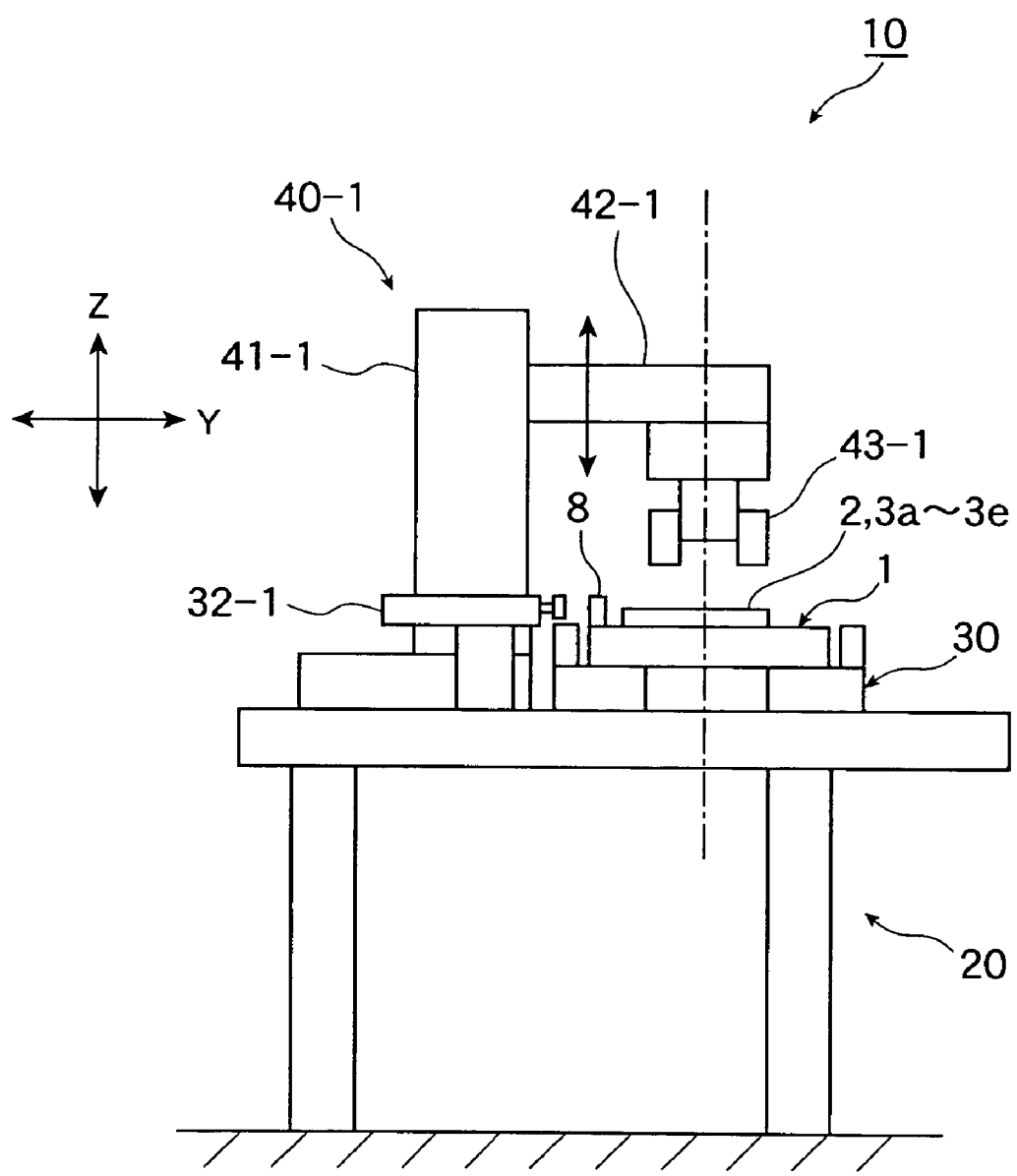
FIG. 2 is a side view of an assembling apparatus including the assembly-target-object-and-assembly-component carrier pallet of FIG. 1.
Figure 3:
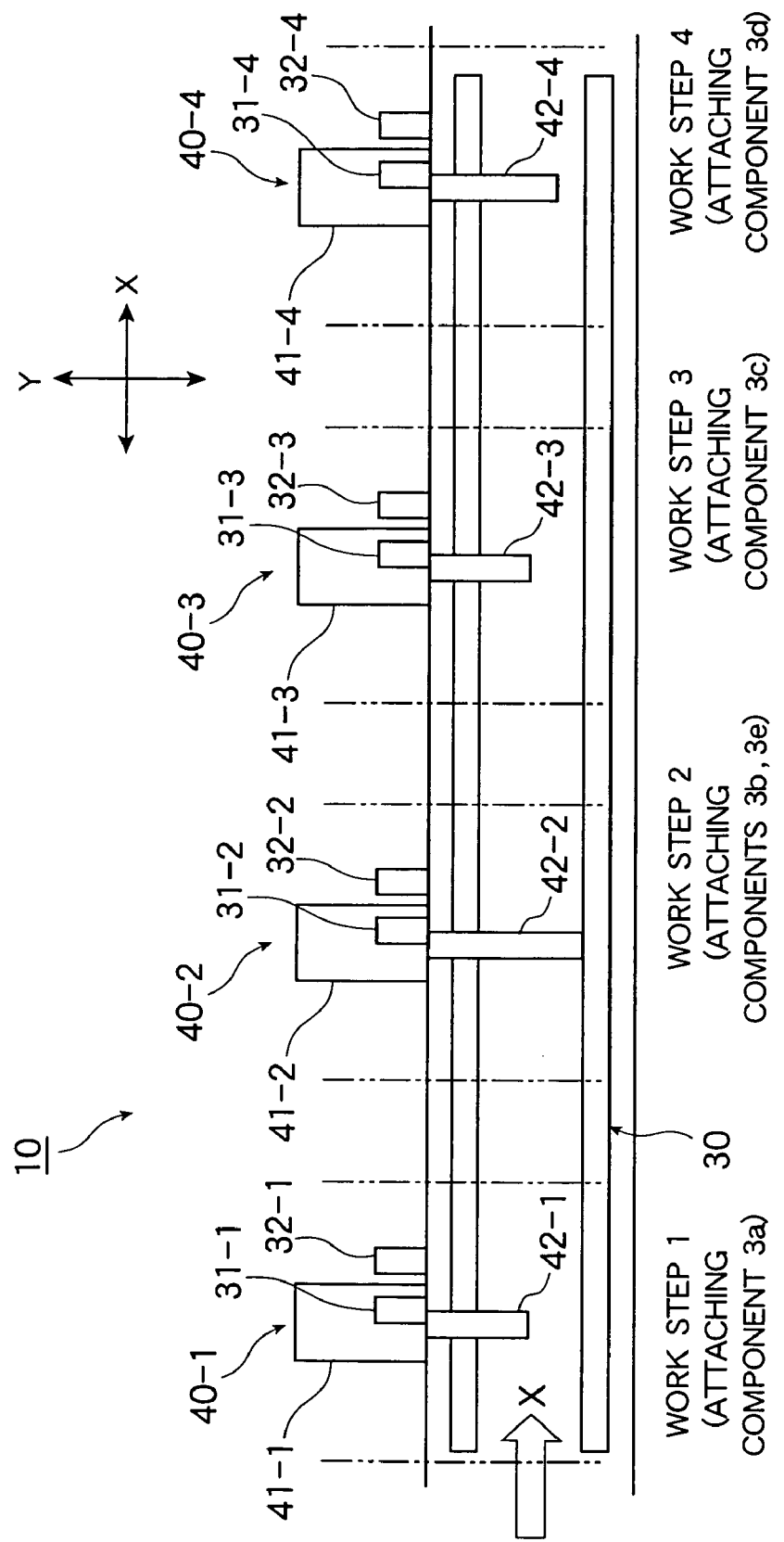
FIG. 3 is a schematic plan view showing the overall configuration of the assembling apparatus of FIG. 2, excluding an illustration of the assembly-target-object-and-assembly-component carrier pallet of FIG. 1.
Figure 4:
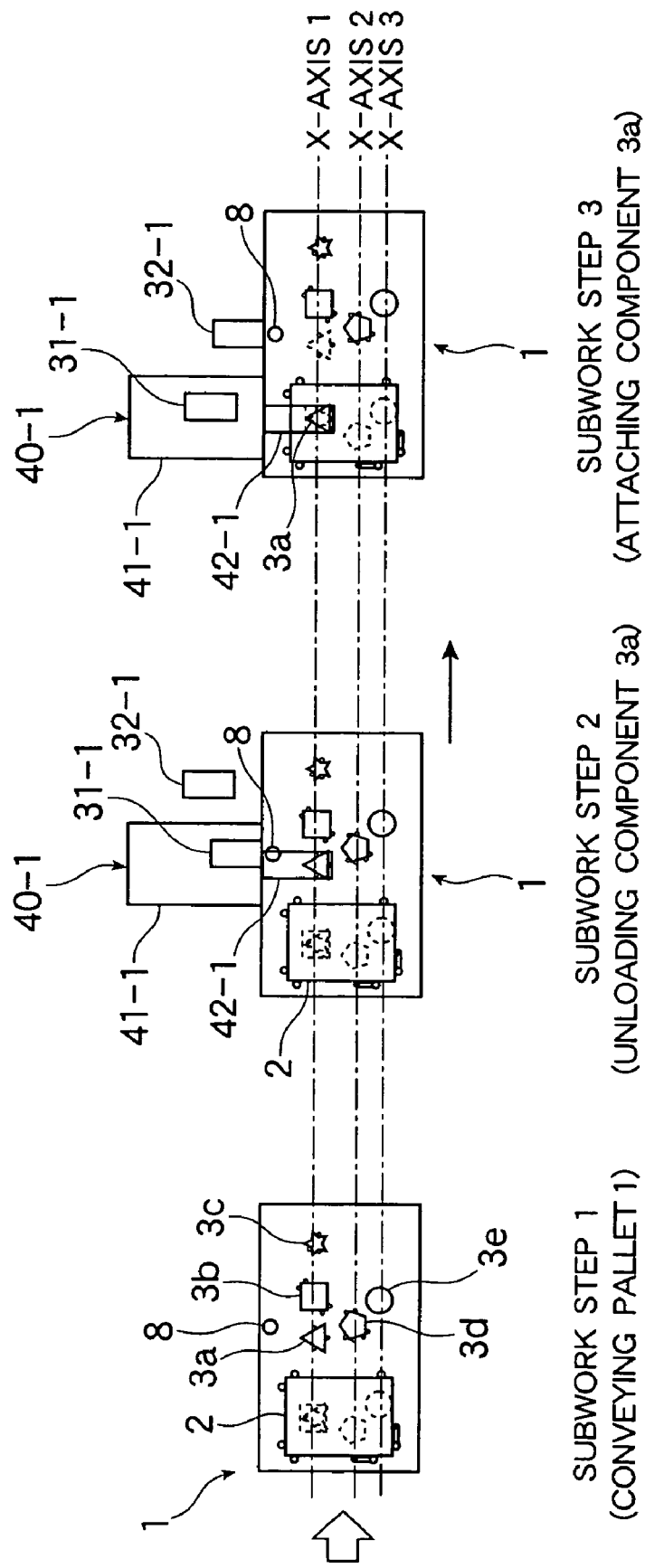
FIG. 4 is a view showing the flow of assembling work carried out by one assembling means which partially constitutes the assembling apparatus of FIG. 2.

FIG. 1 is a plan view of an assembly-target-object-and-assembly-component carrier pallet according to the present Embodiment 1. FIG. 2 is a side view of an assembling apparatus including the assembly-target-object-and-assembly-component carrier pallet of FIG. 1. FIG. 3 is a schematic plan view showing the overall configuration of the assembling apparatus of FIG. 2, excluding an illustration of the assembly-target-object-and-assembly-component carrier pallet of FIG. 1. FIG. 4 is a view showing the flow of assembling work carried out by one assembling means which partially constitutes the assembling apparatus of FIG. 2.

The assembly-target-object-and-assembly-component carrier pallet of the present Embodiment 1 is used to carry thereon an assembly target object (semi-finished product) and a plurality of assembly components required for assembly when a small-sized precision product, such as an electronic component, is assembled. The assembling apparatus includes the assembly-target-object-and-assembly-component carrier pallet; a conveying apparatus; and at least one assembling means. The conveying apparatus conveys the assembly-target-object-and-assembly-component carrier pallet along a predetermined direction, which will be described later. The assembling means unloads a predetermined assembly component from the assembly-target-object-and-assembly-component carrier pallet and raises and lowers the predetermined assembly component so as to attach the predetermined assembly component to a predetermined attachment position on the assembly target object. When all of the plurality of assembly components required for assembly are attached to predetermined attachment positions, respectively, on the assembly target object, the small-sized precision product is completed.

As shown in FIG. 1, in an assembly-target-object-and-assembly-component carrier pallet 1 of the present Embodiment 1, an assembly target object 2, which is a semi-finished product of a small-sized precision product, such as an electronic component, and a plurality of assembly components 3a, 3b, 3c . . . are positioned at respective predetermined positions on a rectangular carrying surface quiescently and horizontally immovably by use of a plurality of positioning pins 4, 5, a positioning ring 6, a plurality of pressing levers 7, etc. which are selected according to their shapes. The assembly target object 2 has a rectangular shape as viewed in plane. Two sides of the rectangular shape which form a corner of the rectangular shape are pressed toward respective opposite two corners by means of the respective pressing levers 7, whereby the assembly target object 2 is positioned quiescently and horizontally immovably. Each of the respective opposite two corners is positioned such that two sides which form the corner are supported by the positioning pins 4. In the present Embodiment 1, five assembly components; namely, the assembly components 3a to 3e, are used. For easy understanding of description, the assembly components 3a to 3e are illustrated in a schematically typified manner.

The assembly target object 2 is placed on the carrying surface of the assembly-target-object-and-assembly-component carrier pallet 1 and is located at the rear side (at the left side in FIG. 1) with respect to the direction (X-direction) in which the carrier pallet 1 is conveyed by the conveying apparatus, such as a conveyor. The assembly components 3a to 3e are placed frontward of the assembly target object 2 in the direction. Of the assembly components 3a to 3e, the assembly components 3a, 3b, 3c are placed on an X-axis 1 along the X-direction and are arranged in the order from the rear side to the front side in the X-direction. The assembly component 3d is placed on an X-axis 2, which extends along the X-direction, to be located frontward of the assembly component 3a and rearward of the assembly component 3b. Further, the assembly component 3e is placed on an X-axis 3, which extends along the X-direction, to be located at the same position as that of the assembly component 3b. The X-axis 1 to X-axis 3 are three axes arranged at predetermined intervals in a Y-direction in parallel with the X-direction.

A plurality of assembling means 40-1 to 40-4 (see FIG. 3), which will be described later, are installed for the assembly components 3a to 3e and attach the associated assembly components 3a to 3e to a plurality of attachment positions, respectively, on the assembly target object 2. In FIG. 1, the attachment positions are depicted by dashed lines by use of the same figures (see figures marked with 3a' to 3e') as those of the assembly components 3a to 3e. As is apparent from FIG. 1, the attachment positions on the assembly target object 2 where the assembly components 3a to 3e are to be attached are located on the same X-axes as those where the assembly components 3a to 3e are located. Accordingly, by means of relative movement in relation to the carrier pallet 1 along the X-axis (any one of the X-axis 1 to X-axis 3) in the direction opposite the direction of conveying the carrier pallet 1, the assembling means 40-1 to 40-4 can transfer and attach the associated assembly components 3a to 3e to the respective attachment positions. In the present Embodiment 1, the relative movement of the assembling means 40-1 to 40-4 in relation to the carrier pallets 1 is effected through conveyance of the carrier pallet 1 by a conveying apparatus 30, which will be described later.

It will be understood from the above description that the placement position of the assembly target object 2 on the assembly-target-object-and-assembly-component carrier pallet 1 and the placement positions of the assembly components 3a to 3e on the assembly-target-object-and-assembly-component carrier pallet 1 are in the following relation.

As viewed in plane, the placement position of a predetermined assembly component (any one of the assembly components 3a to 3e) on the assembly-target-object-and-assembly-component carrier pallet 1 is on a straight line (any one of the X-axis 1 to X-axis 3) which passes through a predetermined attachment position on the assembly target object 2 where the predetermined assembly component is to be attached, and which is oriented in a predetermined direction; i.e., in the direction (X-direction) of conveying the assembly-target-object-and-assembly-component carrier pallet 1 by the conveying apparatus 30, such as a conveyor.

The placement position of the assembly target object 2 on the assembly-target-object-and-assembly-component carrier pallet 1 and the placement positions of the assembly components 3a to 3e on the assembly-target-object-and-assembly-component carrier pallet 1 are in the above-mentioned relation. By virtue of this, by means of relative movement in relation to the carrier pallet 1 along any one of the X-axis 1 to X-axis 3 in the direction opposite the direction of conveying the assembly-target-object-and-assembly-component carrier pallet 1, the assembling means 40-1 to 40-4 can transfer the associated assembly components 3a to 3e to the respective attachment positions on the assembly target object 2. Thus, the moving mechanism of each of the assembling means 40-1 to 40-4 can be configured in a minimum necessary manner.

A positioning pin 8 is provided on the assembly-target-object-and-assembly-component carrier pallet 1 and is used as a mark for positioning and holding the assembly-target-object-and-assembly-component carrier pallet 1 at a predetermined stop position. When pallet-positioning-holding means 31-1 to 31-4, 32-1 to 32-4 (see FIG. 3), which will be described later, of the conveying apparatus 30 detect the positioning pin 8, the conveying apparatus 30 positions and holds the assembly-target-object-and-assembly-component carrier pallet 1 at the associated predetermined stop positions. The action of the pallet-positioning-holding means 31-1 to 31-4, 32-1 to 32-4 will be described in detail later.

Next, the structure of an assembling apparatus 10 including the assembly-target-object-and-assembly-component carrier pallet 1 of the present Embodiment 1 will be described in detail with reference to FIGS. 2 and 3.

As shown in FIGS. 2 and 3, the assembling apparatus 10 of the present Embodiment 1 includes not only the assembly-target-object-and-assembly-component carrier pallet 1 but also the conveying apparatus 30 and a plurality of assembling means 40-1, 40-2, . . . . The conveying apparatus 30 includes a roller conveyor or a slider (a linear moving mechanism) and conveys the carrier pallet 1 along the X-direction as mentioned previously. The assembling means 40-1, 40-2, are juxtaposed along the conveyance direction of the conveying apparatus 30. When the assembly-target-object-and-assembly-component carrier pallet 1 is conveyed to the positions of the assembling means 40-1, 40-2, . . . , each of the assembling means 40-1, 40-2, . . . unloads an associated predetermined assembly component (any one of the assembly components 3a to 3e) from the carrier pallet 1 and raises and lowers the predetermined assembly component so as to attach the predetermined assembly component to the corresponding predetermined attachment position on the assembly target object 2. The conveying apparatus 30 and the assembling means 40-1, 40-2, . . . are installed on a base frame 20, which is formed of horizontal and vertical frame members.

The number of the assembling means is at least one. The present Embodiment 1 employs four assembling means. The assembling means 40-1 is associated with the assembly component 3a; the assembling means 40-2 is associated with the assembly components 3b, 3e; the assembling means 40-3 is associated with the assembly component 3c; and the assembling means 40-4 is associated with the assembly component 3d. The assembling means 40-1 to 40-4 sequentially unload the respectively associated assembly components 3a to 3e from the assembly-target-object-and-assembly-component carrier pallet 1 and raise and lower the respectively associated assembly components 3a to 3e to the corresponding predetermined attachment positions on the assembly target object 2 (work steps 1 to 4). When all of the assembly components 3a to 3e required for assembly are attached to the predetermined attachment positions on the assembly target object 2, the small-sized precision product is completed.

The assembling means 40-2 has holding hands 43-2b, 43-2e (not shown) for holding the assembly components 3b, 3e, at two longitudinally separated positions on a horizontally extending long arm 42-2. Thus, the assembling means 40-2 can attach the two assembly components 3b, 3e, while staying at the same position, to the respective attachment positions on the assembly target object 2. The assembling means 40-1 to 40-4 move merely in the vertical direction. When the assembling means 40-1 to 40-4 lower the associated, raised assembly components so as to attach the assembly components to the corresponding attachment positions on the assembly target object 2, the carrier pallet 1 is moved by respective predetermined amounts in the X-direction. In this manner, the assembling means 40-1 to 40-4 move merely in the vertical direction, whereby the mechanical error associated with transfer of a component can be reduced.

The assembling means 40-1 to 40-4 have the same structure except for the arms 42-1 to 42-4 and the holding hands 43-1 to 43-4. Reference numerals 41-1 to 41-4 denote support stands, which have respective incorporated lift mechanisms for vertically moving the arms 42-1 to 42-4, respectively.

The conveying apparatus 30 includes the pallet-positioning-holding means 31-1 to 31-4, 32-1 to 32-4. When the assembly-target-object-and-assembly-component carrier pallet 1 is conveyed to assembling stations of the assembling means 40-1 to 40-4, the pallet-positioning-holding means 31-1 to 31-4, 32-1 to 32-4 position and hold the carrier pallet 1 at predetermined stop positions at the individual assembling stations.

The "predetermined stop positions" are a position where each of the assembling means 40-1 to 40-4 unloads the predetermined assembly component (any one of the assembly components 3a to 3e) from the assembly-target-object-and-assembly-component carrier pallet 1 and raises the unloaded, predetermined assembly component (hereinafter, the position is referred to as the "component-unloading position"), and a position where each of the assembling means 40-1 to 40-4 lowers the raised, predetermined assembly component and attaches the predetermined assembly component to the corresponding predetermined attachment position on the assembly target object 2 (hereinafter, the position is referred to as the "component-attaching position"). When an unillustrated carrier pallet detection means (sensor) detects that the carrier pallet 1 has arrived at the component-unloading position, each of the pallet-positioning-holding means 31-1 to 31-4 stops the conveying apparatus 30 and activates a positioning-holding mechanism incorporated therein, thereby holding the positioning pin 8 of the carrier pallet 1 for positioning and immovably holding the carrier pallet 1 at the component-unloading position. When an unillustrated carrier pallet detection means detects that the carrier pallet 1 has arrived at the component-attaching position, each of the pallet-positioning-holding means 32-1 to 32-4 stops again the conveying apparatus 30 and activates a positioning-holding mechanism incorporated therein, thereby holding again the positioning pin 8 of the carrier pallet 1 for positioning and immovably holding the carrier pallet 1 at the component-attaching position.

For more understandably describing the above-mentioned actions of the pallet-positioning-holding means 31-1 to 31-4, 32-1 to 32-4, the pallet-positioning-holding means 31-1, 32-1 are taken as representative examples below, and there will be described in detail with reference to FIG. 4 a work step (work step 1) for attaching the assembly component 3a to the corresponding predetermined attachment position on the assembly target object 2 at the assembling station of the assembling means 40-1.

The above-mentioned work step 1 (see FIG. 3), which is carried out at the assembling station of the assembling means 40-1, is described in more detail below while being divided into three subwork steps 1 to 3 as shown in FIG. 4.

First, the assembly-target-object-and-assembly-component carrier pallet 1 is conveyed from an upstream step to the assembling station of the assembling means 40-1 by the conveying apparatus 30. The assembly-target-object-and-assembly-component carrier pallet 1 carries thereon the assembly target object 2 and the assembly components 3a to 3e at respective predetermined positions (subwork step 1).

Next, when the carrier pallet detection means detects, at a certain position, the assembly-target-object-and-assembly-component carrier pallet 1 which has arrived at the assembling station of the assembling means 40-1, a signal is input to an unillustrated control unit. Under an instruction from the control unit, the conveying apparatus 30 is stopped at that position (component-unloading position). At the same time, the pallet-positioning-holding means 31-1 activates the positioning-holding mechanism incorporated therein, thereby holding the positioning pin 8 of the carrier pallet 1 for positioning and immovably holding the carrier pallet 1 at the component-unloading position. At this time, the assembly component 3a is positioned immediately under the holding hand 43-1 of the assembling means 40-1. Next, the holding hand 43-1 lowers; holds the assembly component 3a; unloads the assembly component 3a from the carrier pallet 1; and raises the assembly component 3a (working described in this paragraph is of subwork step 2).

Upon completion of unloading of the component, the pallet-positioning-holding means 31-1 releases the carrier pallet 1, thereby allowing the carrier pallet 1 to move. The conveying apparatus 30 is again activated and moves the carrier pallet 1 by a predetermined amount. By this procedure, the carrier pallet detection means detects, at a certain position, the carrier pallet 1, and the conveying apparatus 30 is stopped at that position (component-attaching position). At the same time, the pallet-positioning-holding means 32-1 activates the positioning-holding mechanism incorporated therein, thereby holding the positioning pin 8 of the carrier pallet 1 for positioning and immovably holding the carrier pallet 1 at the component-attaching position. At this time, the assembly component 3a held by the holding hand 43-1 is positioned immediately above the corresponding attachment position on the assembly target object 2. Next, the holding hand 43-1 lowers and places the assembly component 3a at the attachment position and activates an attaching jig incorporated therein so as to attach the assembly component 3a to the attachment position. Then, the holding hand 43-1 releases the assembly component 3a and rises back to its original position. Subsequently, the pallet-positioning-holding means 32-1 releases the carrier pallet 1, thereby canceling the positioning and holding of the carrier pallet 1 (working described in this paragraph is of subwork step 3).

Through the above-mentioned subwork steps 1 to 3, there is completed the work of attaching the assembly component 3a to the assembly target object 2 at the assembling station of the assembling means 40-1.

The assembly-target-object-and-assembly-component carrier pallet 1 is then conveyed to the assembling station of the next assembling means 40-2 by the conveying apparatus 30. At the assembling station, the assembly components 3b, 3e are attached to the assembly target object 2. The assembly components 3b, 3e are located on the X-axis 1 and the X-axis 3, respectively, at the same position with respect to the X-direction (see FIG. 1). Thus, the pallet-positioning-holding means 31-1, 32-1 operate in a manner similar to that at the assembling station of the assembling means 40-1. As mentioned previously, the two holding hands 43-2b, 43-2e (not shown) are provided for handling the assembly components 3b, 3e. These holding hands are sequentially operated and attach these components to the corresponding predetermined attachment positions on the assembly target object 2.

Subsequently, similarly, the assembling means 40-3, 40-4 attach the assembly components 3c, 3d, respectively, to the assembly target object 2 at the respective assembling stations (see FIG. 3).

Figure 12:
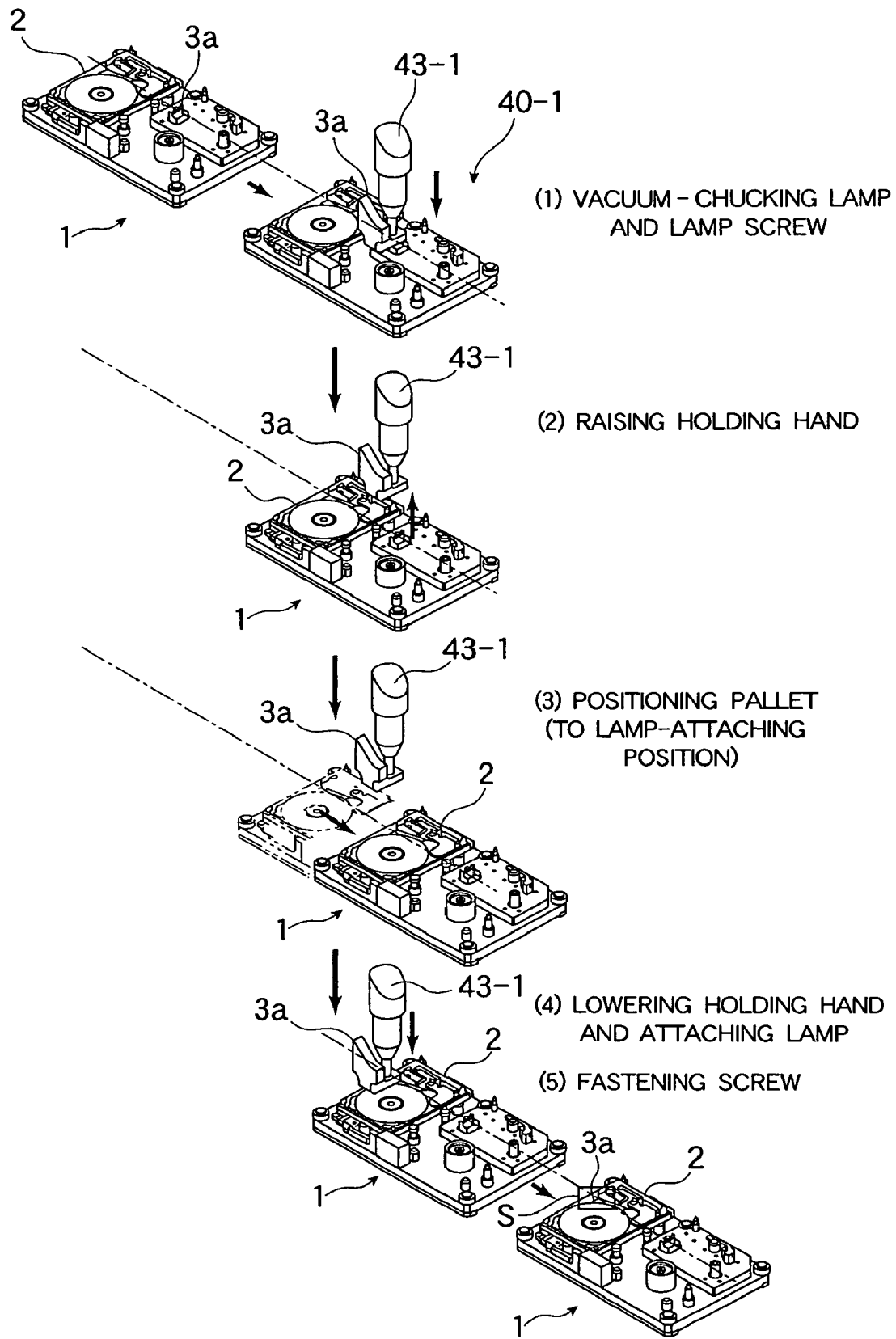
FIG. 12 is a perspective view showing the flow of assembling work carried out by one assembling means which partially constitutes the assembling apparatus according to Embodiment 1.

The perspective view of FIG. 12 illustrates, in an easily understandable manner, the motions which the assembly-target-object-and-assembly-component carrier pallet 1 and the holding hand 43-1 of the assembling means 40-1 carry out in attaching the assembly component 3a to the assembly target object 2 in the assembling station of the assembling means 40-1. The assembly target object 2 is a hard disk drive (HDD), and the assembly component 3a is a lamp.

The arrangement of the assembly components 3a to 3e on the assembly-target-object-and-assembly-component carrier pallet 1 differs from that in FIG. 1. However, in the following description, the lamp and a set screw for the lamp to be unloaded by the holding hand 43-1 is considered as the assembly component 3a.

Referring to FIG. 12, in view (1), when the assembly-target-object-and-assembly-component carrier pallet 1 is conveyed to the assembling station of the assembling means 40-1 by the conveying apparatus 30, the holding hand 43-1 lowers and vacuum-chucks the assembly component 3a placed on the carrier pallet 1 and then unloads the assembly component 3a from the carrier pallet 1. Next, in view (2), the holding hand 43-1 raises the unloaded assembly component 3a (working described in this paragraph is of subwork step 2).

Next, in view (3), the conveying apparatus 30 is again activated and moves the carrier pallet 1 by a predetermined amount for positioning and is then stopped. Next, in views (4) and (5), the holding hand 43-1 lowers; places the assembly component 3a at the attachment position; and activates an attaching jig incorporated therein, thereby fastening the screw for attaching the assembly component 3a to the attachment position. Next, although unillustrated in view (5), the holding hand 43-1 releases the assembly component 3a and rises back to its original position (working described in this paragraph is of subwork step 3).

Figure 11:
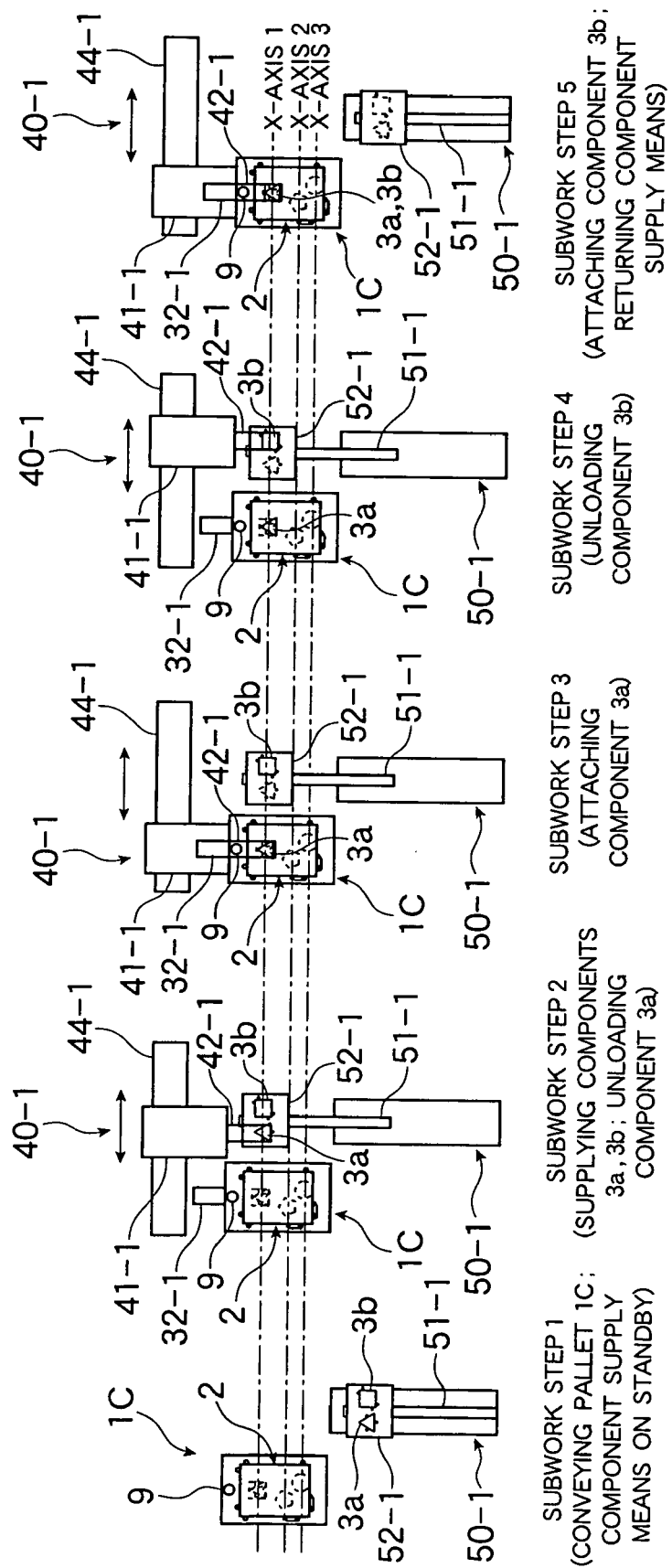
FIG. 11 is a view showing the flow of assembling work carried out by one assembling means which partially constitutes an assembling apparatus according to a further embodiment (Embodiment 7) of the present invention, and corresponding to FIG. 8, which shows Embodiment 5.
Figure 13:
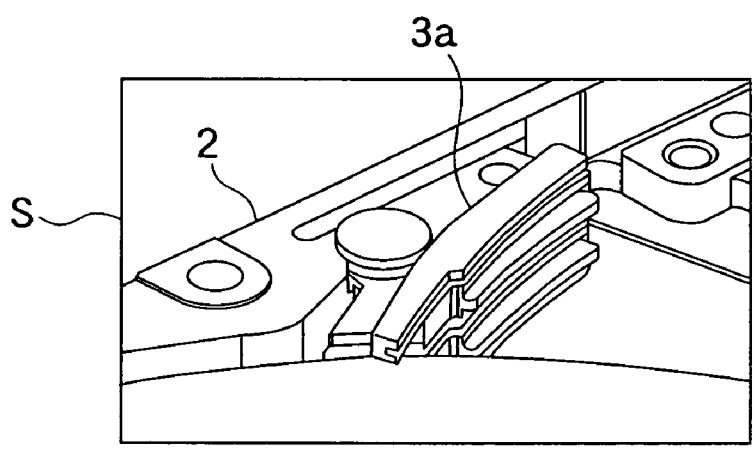
FIG. 13 is an enlarged view of region S in FIG. 12.

The specific procedure for screwing the assembly component 3a to the assembly target object 2 is shown in FIG. 13, which shows, on an enlarged scale, a portion S of the view (5) in FIG. 12. In the above-mentioned subwork step 3, when the lamp is placed at its attachment position, as shown in FIG. 11, the lamp is set at a predetermined position of a disk of the HDD. Next, the screw is fastened. The attaching jig incorporated in the holding hand 43-1 carries out these motions continuously and automatically.

The carrier pallet 1 which has undergone attachment of the assembly component 3a is conveyed to the assembling station of the next assembling means 40-2 by the conveying apparatus 30.

In the present Embodiment 1, in the case where the conveying apparatus 30 is, for example, a conveyor, the conveying apparatus 30 can be configured as follows: a stepping motor, a servomotor, or the like is used as a drive source, and the operation of the drive source is numerically controlled. In the case where the conveyor apparatus 30 is, for example, a slider, the conveying apparatus 30 can be configured as follows: a linear motor, a stepping motor, a servomotor, or the like is used as a drive source, and the operation of the drive source is numerically controlled. In either case, such a configuration enables the conveying apparatus 30 itself to be configured to have a positioning-holding function for positioning and holding a pallet, so that the cost of equipment can be reduced. Also, an unnecessary motion is not involved, so that the work efficiency of assembly can be improved.

In the present Embodiment 1, the assembling apparatus 10 can further include atmospheric cleaning means for maintaining, in a clean atmosphere, the region (assembling stations) where the assembling means 40-1 to 40-4 carry out assembling work. Through employment of the atmospheric cleaning means, the region where the assembling means 40-1 to 40-4 carry out assembling work is maintained in a clean atmosphere at all times. This enables assembling of small components, which would otherwise be adversely affected by dust. Since the moving mechanism of an attaching device of each of the assembling means 40-1 to 40-4 is configured in a minimum necessary manner, the clean atmosphere which is maintained at all times in the region where the assembling means 40-1 to 40-4 carry out assembling work is not broken. Therefore, assembling of small components, which would otherwise be adversely affected by dust, can be performed continuously. The atmospheric cleaning means can be configured as follows. An air cleaner having a filter incorporated therein is installed in the ceiling of a room in which the assembling apparatus 10 is accommodated. An exhaust fan is installed in the floor of the room. Air is introduced into the room from the outside of the room via the air cleaner. The cleaned air is led downward and is then exhausted to the underfloor by the exhaust fan.

The assembly-target-object-and-assembly-component carrier pallet and the assembling apparatus of the present Embodiment 1 are configured as described above and thus can yield the following effects.

In attaching the assembly components 3a to 3e placed on the assembly-target-object-and-assembly-component carrier pallet 1 to the corresponding predetermined attachment positions on the assembly target object 2 placed on the carrier pallet 1, associated transfer motions are carried out as follows. Each of the assembly components 3a to 3e is unloaded from the assembly-target-object-and-assembly-component carrier pallet 1 and is then raised. Next, as viewed in plane, each of the assembly components 3a to 3e undergoes relative movement in relation to the carrier pallet 1 to the predetermined attachment position on the assembly target object 2 along the straight line which passes through the attachment position and which is oriented in a predetermined direction (a direction in parallel with the conveyance direction (X-direction) of the conveying apparatus 30). Then, each of the assembly components 3a to 3e is lowered to the attachment position. Therefore, the moving mechanism of each of the assembling means 40-1 to 40-4 can be configured in a minimum necessary manner.

Thus, the structure of the assembling apparatus 10 can be simplified, whereby the cost of equipment can be reduced. Also, time required for transfer of each of the assembly components 3a to 3e can be reduced, whereby work efficiency can be improved. Further, since the motion in plane of each of operating devices (assembling means 40-1 to 40-4) required for assembly is designed so that each of the operating devices can carry out assembling work by means of a single operating mechanism, the accumulation of mechanical errors of the operating devices can be minimized. Thus, the mechanical error of the moving mechanism can be reduced, thereby improving accuracy in attaching the assembly components 3a to 3e to the assembly target object 2 and thus improving the assembling accuracy of a product. Therefore, even small assembly components can be assembled accurately.

The relative movement of the assembling components and the assembly target object is effected by the conveying operation of the conveying apparatus 30. The transfer motion of the assembling means 40-1 to 40-4 involves only vertical movement, performed while holding each of the assembly components 3a to 3e, and does not involve movement in plane. Therefore, the number of moving mechanisms can be further reduced, and the mechanical error can be further reduced. This can further improve accuracy in attaching the assembly components 3a to 3e to the assembly target object 2, so that the assembling accuracy of a product can be further improved.

The conveying apparatus 30 includes the pallet-positioning-holding means 31-1 to 31-4, 32-1 to 32-4 for positioning and holding the assembly-target-object-and-assembly-component carrier pallet 1 at predetermined stop positions. The predetermined stop positions are a position where each of the assembling means 40-1 to 40-4 unloads the predetermined assembly component (any one of the assembly components 3a to 3e) from the assembly-target-object-and-assembly-component carrier pallet 1 and raises the predetermined assembly component (component-unloading position), and a position where each of the assembling means 40-1 to 40-4 lowers the raised, predetermined assembly component and attaches the predetermined assembly component to the predetermined attachment position on the assembly target object 2 (component-attaching position). Thus, the assembling means 40-1 to 40-4 can accurately hold (unload) and attach the assembly components 3a to 3e. Further, even small assembly components can be assembled with high accuracy.

Further, the conveying apparatus 30 can be configured as follows: a stepping motor, a servomotor, a linear motor, or the like is used as a drive source, and the operation of the drive source is numerically controlled. Such a configuration enables the conveying apparatus 30 itself to be configured to have a positioning-holding function for positioning and holding a pallet, so that the cost of equipment can be further reduced. Also, an unnecessary motion is not involved, so that the work efficiency of assembly can be further improved.

In the case where the assembling apparatus 10 further includes atmospheric cleaning means for maintaining, in a clean atmosphere, the region (assembling stations) where the assembling means 40-1 to 40-4 carry out assembling work, the region where the assembling means 40-1 to 40-4 carry out assembling work is maintained in a clean atmosphere at all times. This enables assembling of small components, which would otherwise be adversely affected by dust. Since the moving mechanism of an attaching device of each of the assembling means 40-1 to 40-4 is configured in a minimum necessary manner, the clean atmosphere which is maintained at all times in the region where the assembling means 40-1 to carry out assembling work is not broken. Therefore, assembling of small components, which would otherwise be adversely affected by dust, can be performed continuously.

Embodiment 2

Next, another embodiment (Embodiment 2) of the present invention will be described.

Figure 5:
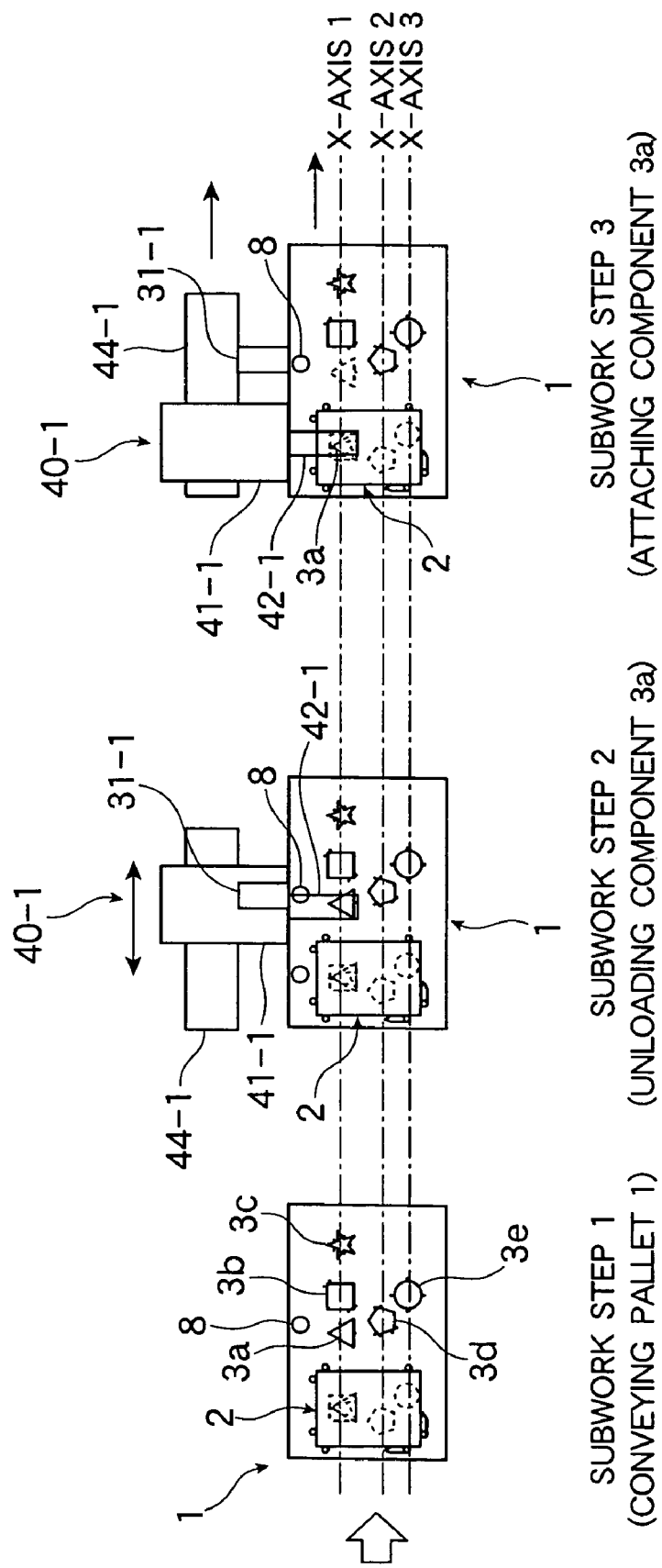
FIG. 5 is a view showing the flow of assembling work carried out by one assembling means which partially constitutes an assembling apparatus according to another embodiment (Embodiment 2) of the present invention, and corresponding to FIG. 4, which shows Embodiment 1.

FIG. 5 is a view showing the flow of assembling work carried out by one assembling means which partially constitutes an assembling apparatus according to the present Embodiment 2, and corresponding to FIG. 4, which shows Embodiment 1.

The assembling apparatus 10 of the present Embodiment 2 differs from the assembling apparatus 10 of Embodiment 1 in that the assembling means 40-1 to 40-4 include assembling-means-moving mechanisms 44-1 to 44-4, respectively, and that the conveying apparatus 30 includes the pallet-positioning-holding means 31-1 to 31-4, but does not include the pallet-positioning-holding means 32-1 to 32-4. Other structural features are similar to those of Embodiment 1; thus, detailed description thereof is omitted.

The assembling apparatus 10 of the present Embodiment 2 is configured as mentioned above and functions as follows.

The work step 1 (see FIG. 3) is carried out at the assembling station of the assembling means 40-1, which, together with other assembling means 40-2 to 40-4, partially constitutes the assembling apparatus 10, and is described in more detail below while being divided into three subwork steps 1 to 3 as shown in FIG. 5.

First, the assembly-target-object-and-assembly-component carrier pallet 1 is conveyed by the conveying apparatus 30 from an upstream step to the assembling station of the assembling means 40-1. The assembly-target-object-and-assembly-component carrier pallet 1 carries thereon the assembly target object 2 and the assembly components 3a to 3e at respective predetermined positions (subwork step 1, similar to Embodiment 1).

Next, when unillustrated carrier pallet detection means (sensor) detects, at a certain position, the assembly-target-object-and-assembly-component carrier pallet 1 which has arrived at the assembling station of the assembling means 40-1, a signal is input to an unillustrated control unit. Under an instruction from the control unit, the conveying apparatus 30 is stopped at that position (component-unloading position). At the same time, the pallet-positioning-holding means 31-1 activates the positioning-holding mechanism incorporated therein, thereby holding the positioning pin 8 of the carrier pallet 1 for positioning and immovably holding the carrier pallet 1 at the component-unloading position. At this time, the assembly component 3a is positioned immediately under the holding hand 43-1 of the assembling means 40-1 (see FIG. 2). Next, the holding hand 43-1 lowers; holds the assembly component 3a; unloads the assembly component 3a from the carrier pallet 1; and raises the assembly component 3a (working described in this paragraph is of subwork step 2; similar to Embodiment 1).

Next, the assembling-means-moving mechanism 44-1 is activated and moves the assembling means 40-1 by a predetermined amount in the direction opposite the conveyance direction of the conveying apparatus 30. During this movement, the carrier pallet 1 is immovably held at the above-mentioned position (component-unloading position). At this time, the assembly component 3a held by the holding hand 43-1 is positioned immediately above the corresponding attachment position on the assembly target object 2. Next, the holding hand 43-1 lowers and places the assembly component 3a at the attachment position and activates an attaching jig incorporated therein so as to attach the assembly component 3a to the attachment position. Then, the holding hand 43-1 releases the assembly component 3a and rises, and the assembling means 40-1 returns to its original position. Subsequently, the pallet-positioning-holding means 31-1 releases the carrier pallet 1, thereby canceling the positioning and holding of the carrier pallet 1 (working described in this paragraph is of subwork step 3).

Through the above-mentioned subwork steps 1 to 3, there is completed the work of attaching the assembly component 3a to the assembly target object 2 at the assembling station of the assembling means 40-1. The assembly-target-object-and-assembly-component carrier pallet 1 is then conveyed to the assembling station of the next assembling means 40-2 by the conveying apparatus 30. The subsequent flow of work of attaching the assembly components 3b to 3e to the assembly target object 2 is similar to that of Embodiment 1. The mode for attaching the assembly components 3b to 3e to the assembly target object 2 is similar to the above-mentioned mode for attaching the assembly component 3a to the assembly target object 2 in the present Embodiment 2.

Since the assembly-target-object-and-assembly-component carrier pallet and the assembling apparatus of the present Embodiment 2 are configured as described above, even though each of the assembling means 40-1 to 40-4 involves an additional horizontal movement, the assembling means 40-1 to 40-4 can accurately hold (unload) and attach the assembly components 3a to 3e in a manner substantially similar to that of Embodiment 1, thereby maintaining the mechanical error at a reduced level. Further, even small assembly components can be assembled with high accuracy.

According to a modification of the present Embodiment 2, the holding hand 43-1 at the assembling station 40-1 is configured to be able to hold each of the assembly components 3a, 3b, 3c. The assembling means 40-1 reciprocally moves a plurality of times (3 times); i.e., moves between an unloading position and a predetermined attachment position on the assembly target object for each of the assembly components 3a, 3b, 3c, thereby attaching the assembly components 3a, 3b, 3c. In this case, at the assembling station of the assembling means 40-2, only the assembly component 3e is attached. Since assembly at the assembling station of the assembling means 40-3 (work step 3) becomes unnecessary, the cost of equipment can be reduced. Also, since an associated unnecessary conveying motion and positioning motion can be eliminated, the efficiency of assembling work can be further improved.

Embodiment 3

Next, a further embodiment (Embodiment 3) of the present invention will be described.

Figure 6:
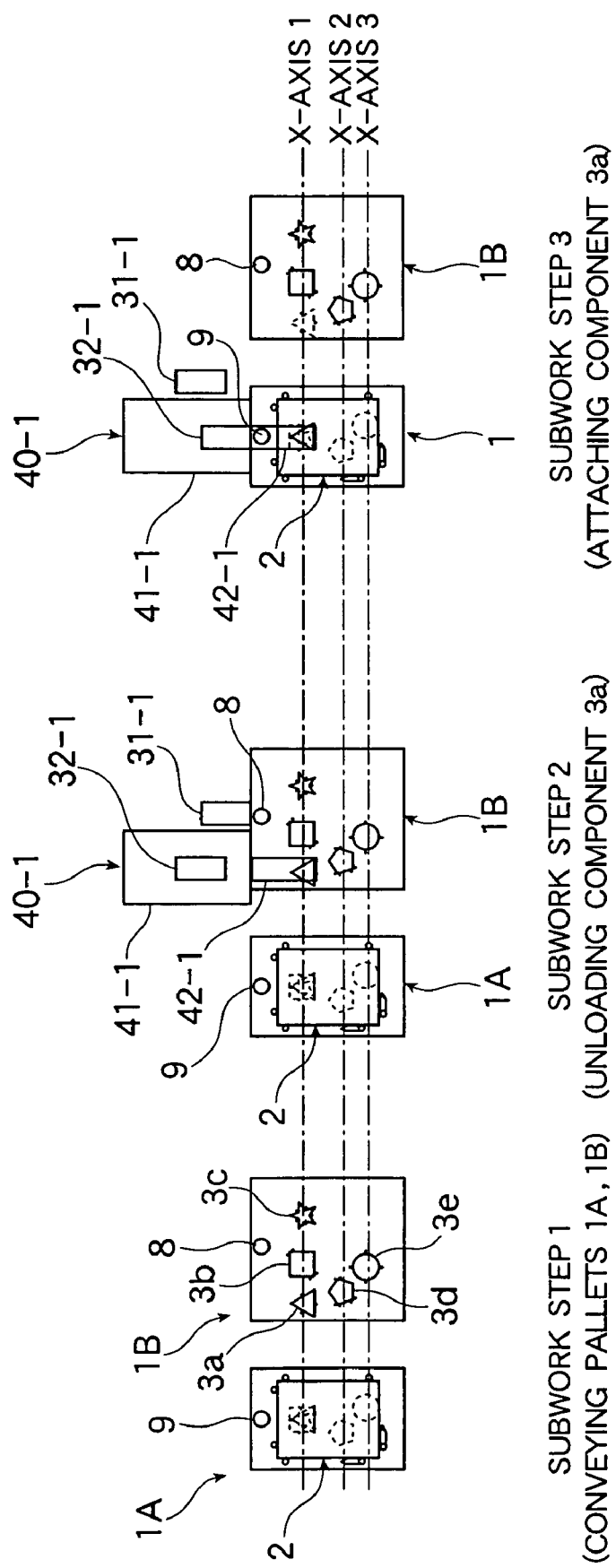
FIG. 6 is a view showing the flow of assembling work carried out by one assembling means which partially constitutes an assembling apparatus including an assembly-target-object-and-assembly-component carrier pallet according to a further embodiment (Embodiment 3) of the present invention, and corresponding to FIG. 4, which shows Embodiment 1.

FIG. 6 is a view showing the flow of assembling work carried out by one assembling means which partially constitutes an assembling apparatus including an assembly-target-object-and-assembly-component carrier pallet according to the present Embodiment 3, and corresponding to FIG. 4, which shows Embodiment 1.

The assembly-target-object-and-assembly-component carrier pallet 1 of the present Embodiment 3 differs from that of Embodiment 1 in that the assembly-target-object-and-assembly-component carrier pallet 1 is divided into two carrier subpallets; namely, an assembly-target-object carrier subpallet 1A and an assembly-component carrier subpallet 1B. The assembly-target-object carrier subpallet 1A is used to carry thereon the assembly target object 2. The assembly-component carrier subpallet 1B is used to carry thereon the assembly components 3a to 3e.

The relation between the placement position of the assembly target object 2 on the assembly-target-object carrier subpallet 1A and the placement positions of the assembly components 3a to 3e on the assembly-component carrier subpallet 1B is basically similar to the relation in Embodiment 1 between the placement position of the assembly target object 2 on the assembly-target-object-and-assembly-component carrier pallet 1 and the placement positions of the assembly components 3a to 3e on the assembly-target-object-and-assembly-component carrier pallet 1. Therefore, the effect which the positional relation yields is similar to that yielded in Embodiment 1.

The conveying apparatus 30 conveys the assembly-target-object carrier subpallet 1A and the assembly-component carrier subpallet 1B in a predetermined direction (X-direction; see FIGS. 1 and 3). At the respective assembling stations, the assembling means 40-1 to 40-4 unload the associated, predetermined assembly components 3a to 3e from the assembly-component carrier subpallet 1B; raise the unloaded assembly components 3a to 3e; and attach the assembly components 3a to 3e to the corresponding predetermined attachment positions on the assembly target object 2. These modes of work are basically similar to those in Embodiment 1.

The conveying apparatus 30 includes the pallet-positioning-holding means 31-1 to 31-4, 32-1 to 32-4 for positioning and holding the assembly-target-object carrier subpallet 1A and the assembly-component carrier subpallet 1B at respective predetermined stop positions. The predetermined stop position of the assembly-component carrier subpallet 1B is a position where each of the assembling means 40-1 to 40-4 unloads a predetermined assembly component among the assembly components 3a to 3e from the assembly-component carrier subpallet 1B and raises the predetermined assembly component (component-unloading position). The predetermined stop position of the assembly-target-object carrier subpallet 1A is a position where each of the assembling means 40-1 to 40-4 lowers the raised, predetermined assembly component among the assembly components 3a to 3e and attaches the predetermined assembly component to the predetermined attachment position on the assembly target object 2 (component-attaching position).

A positioning pin 9 is provided on the assembly-target-object carrier subpallet 1A for positioning the assembly-target-object carrier subpallet 1A by the pallet-positioning-holding means 32-1 to 32-4. This is the second point of difference from Embodiment 1. Since the positioning pin 9 is provided on the assembly-target-object carrier subpallet 1A, the pallet-positioning-holding means 32-1 to 32-4 are provided upstream of the pallet-positioning-holding means 31-1 to 31-4. However, the actions of the pallet-positioning-holding means 31-1 to 31-4, 32-1 to 32-4 are basically similar to those in Embodiment 1.

The movement of each of the assembling means 40-1 to 40-4 from the component-unloading position to the component-attaching position is effected through the conveying apparatus 30 conveying the assembly-target-object carrier subpallet 1A and the assembly-component carrier subpallet 1B in the predetermined direction (X-direction). The assembling means 40-1 to 40-4 are fixed, and merely their arms 42-1 to 42-4 move vertically.

Next will be described in detail with reference to FIG. 6 a specific work step (work step 1; see FIG. 3) in the present Embodiment 3 for attaching the assembly component 3a to the predetermined attachment position on the assembly target object 2 at the assembling station of the assembling means 40-1 among the assembling means 40-1 to 40-4. The actions of the pallet-positioning-holding means 31-1 to 31-4, 32-1 to 32-4 in the present Embodiment 3 will be well understood from this description.

The work step 1 (see FIG. 3), which is carried out at the assembling station of the assembling means 40-1, is described below while being divided into three subwork steps 1 to 3 as shown in FIG. 6 as in the case of Embodiment 1.

First, the assembly-target-object carrier subpallet 1A and the assembly-component carrier subpallet 1B are conveyed from an upstream step to the assembling station of the assembling means 40-1 by the conveying apparatus 30. The assembly-target-object carrier subpallet 1A carries thereon the assembly target object 2. The assembly-component carrier subpallet 1B carries thereon the assembly components 3a to 3e at respective predetermined positions (subwork step 1).

Next, when unillustrated carrier pallet detection means (sensor) detects, at a certain position, the assembly-component carrier subpallet 1B which has arrived at the assembling station of the assembling means 40-1, a signal is input to an unillustrated control unit. Under an instruction from the control unit, the conveying apparatus 30 is stopped at that position (component-unloading position). At the same time, the pallet-positioning-holding means 31-1 activates the positioning-holding mechanism incorporated therein, thereby holding the positioning pin 8 of the carrier subpallet 1B for positioning and immovably holding the carrier subpallet 1B at the component-unloading position. At this time, the assembly component 3a is positioned immediately under the holding hand 43-1 of the assembling means 40-1 (see FIG. 2). Next, the holding hand 43-1 lowers; holds the assembly component 3a; unloads the assembly component 3a from the carrier subpallet 1B; and raises the assembly component 3a. The pallet-positioning-holding means 31-1 releases the carrier subpallet 1B, thereby canceling the positioning and holding of the carrier subpallet 1B (working described in this paragraph is of subwork step 2).

Next, the conveying apparatus 30 is again activated and moves the carrier subpallets 1A, 1B by a predetermined amount. By this procedure, an unillustrated carrier pallet detection means (sensor) detects, at a certain position, the carrier subpallet 1A, and the conveying apparatus 30 is stopped at that position (component-attaching position). At the same time, the pallet-positioning-holding means 32-1 activates the positioning-holding mechanism incorporated therein, thereby holding the positioning pin 9 of the carrier subpallet 1A for positioning and immovably holding the carrier subpallet 1A at the component-attaching position. At this time, the assembly component 3a held by the holding hand 43-1 is positioned immediately above the corresponding attachment position on the assembly target object 2. Next, the holding hand 43-1 lowers and places the assembly component 3a at the attachment position and activates an attaching jig incorporated therein so as to attach the assembly component 3a to the attachment position. Then, the holding hand 43-1 releases the assembly component 3a and rises back to its original position. Subsequently, the pallet-positioning-holding means 32-1 releases the carrier subpallet 1B, thereby canceling the positioning and holding of the carrier subpallet 1B (working described in this paragraph is of subwork step 3).

Through the above-mentioned subwork steps 1 to 3, there is completed the work of attaching the assembly component 3a to the assembly target object 2 at the assembling station of the assembling means 40-1. The assembly-target-object carrier subpallet 1A and the assembly-component carrier subpallet 1B are then conveyed to the assembling station of the next assembling means 40-2 by the conveying apparatus 30. At the assembling station, the assembly components 3b, 3e are attached to the assembly target object 2. Subsequently, similarly, the assembling means 40-3, 40-4 attach the assembly components 3c, 3d, respectively, to the assembly target object 2 at the respective assembling stations.

In the above description, the assembly-target-object carrier subpallet 1A and the assembly-component carrier subpallet 1B are conveyed in a pair by the conveying apparatus 30. However, a plurality of assembly-target-object carrier subpallets and a plurality of assembly-component carrier subpallets may be continuously conveyed. For example, first, three assembly-component carrier subpallets 1B are conveyed; subsequently, one assembly-target-object carrier subpallet 1A is conveyed. Alternatively, first, two assembly-component carrier subpallets 1B are conveyed; subsequently, two assembly-target-object carrier subpallets 1A are conveyed. These modes for conveyance of the carrier subpallets 1A, 1B are selected as appropriate according to the number of assembly components, the number of assembly target objects, a pattern of arrangement of attachment positions on the assembly target object, etc.

The assembly-target-object-and-assembly-component carrier pallet and the assembling apparatus of the present Embodiment 3 are configured as described above and thus yield effects similar to those yielded in Embodiment 1. Further, the assembly-target-object-and-assembly-component carrier pallet 1 is divided into two carrier subpallets; namely, the assembly-target-object carrier subpallet 1A and the assembly-component carrier subpallet 1B. Therefore, a change in specifications of a product, an increase in components, etc. can be flexibly coped with. Also, upon completion of unloading of a component from the assembly-component carrier subpallet 1B, the assembly-component carrier subpallet 1B can be conveyed to the next assembling station by the conveying apparatus 30. Therefore, at the next assembling station, preparation for assembling work can be made beforehand, so that the efficiency of assembling work can be further improved.

Embodiment 4

Next, a further embodiment (Embodiment 4) of the present invention will be described.

Figure 7:
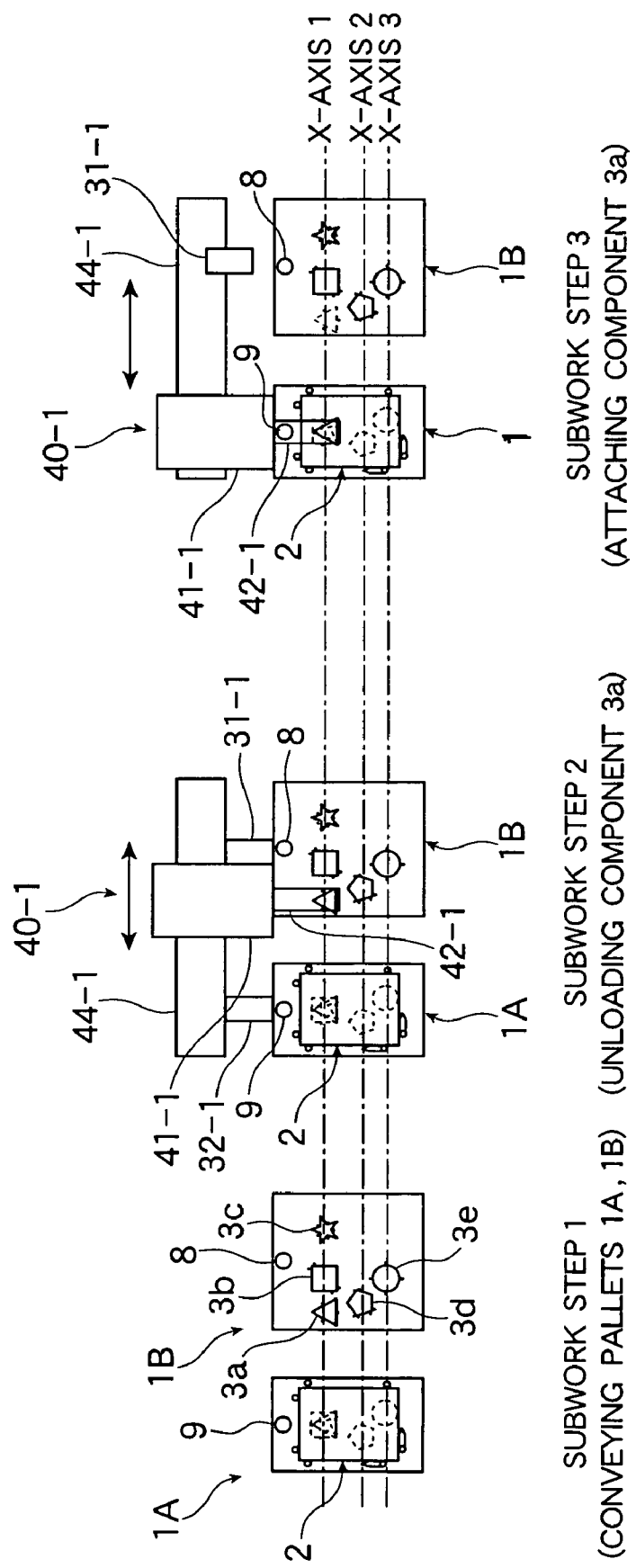
FIG. 7 is a view showing the flow of assembling work carried out by one assembling means which partially constitutes an assembling apparatus according to a further embodiment (Embodiment 4) of the present invention, and corresponding to FIG. 6, which shows Embodiment 3.

FIG. 7 is a view showing the flow of assembling work carried out by one assembling means which partially constitutes an assembling apparatus according to the present Embodiment 4, and corresponding to FIG. 6, which shows Embodiment 3.

The assembling apparatus 10 of the present Embodiment 4 differs from the assembling apparatus 10 of Embodiment 3 in that the assembling means 40-1 to 40-4 include the assembling-means-moving mechanisms 44-1 to 44-4, respectively, and that the pallet-positioning-holding means 31-1 to 31-4, 32-1 to 32-4 of the conveying apparatus 30 position and immovably hold the assembly-component carrier subpallet 1B and the assembly-target-object carrier subpallet 1A simultaneously. Since the pallet-positioning-holding means 31-1 to 31-4, 32-1 to 32-4 position and immovably hold both of the carrier subpallets 1B, 1A simultaneously, an interval between the two carrier subpallets 1B, 1A is rendered accurately equal to that between the two pallet-positioning-holding means 31-1, 32-1, . . . , 31-4, 32-4. Other structural features are similar to those of Embodiment 3; thus, detailed description thereof is omitted.

Next will be described in detail with reference to FIG. 7 a specific work step (work step 1; see FIG. 3) in the present Embodiment 4 for attaching the assembly component 3a to the predetermined attachment position on the assembly target object 2 at the assembling station of the assembling means 40-1 among the assembling means 40-1 to 40-4.

The work step 1 (see FIG. 3), which is carried out at the assembling station of the assembling means 40-1, is described below while being divided into three subwork steps 1 to 3 as shown in FIG. 7 as in the case of Embodiment 3.

First, the assembly-target-object carrier subpallet 1A and the assembly-component carrier subpallet 1B are conveyed from an upstream step to the assembling station of the assembling means 40-1 by the conveying apparatus 30. The assembly-target-object carrier subpallet 1A carries thereon the assembly target object 2. The assembly-component carrier subpallet 1B carries thereon the assembly components 3a to 3e at respective predetermined positions (subwork step 1; similar to Embodiment 3).

Next, when unillustrated carrier pallet detection means (sensors) detect, at certain positions, the assembly-component carrier subpallet 1B and the assembly-target-object carrier subpallet 1A, respectively, which have arrived at the assembling station of the assembling means 40-1, associated signals are input to an unillustrated control unit. Under an instruction from the control unit, the conveying apparatus 30 is stopped at those positions (component-unloading position and component-attaching position). At the same time, the pallet-positioning-holding means 31-1, 32-1 activate the positioning-holding mechanisms incorporated therein, thereby holding the positioning pins 8, 9 of the carrier subpallet 1B, 1A for positioning and immovably holding the carrier subpallets 1B, 1A at the component-unloading position and the component-attaching position, respectively. At this time, the assembly component 3a is positioned immediately under the holding hand 43-1 of the assembling means 40-1 (see FIG. 2). Next, the holding hand 43-1 lowers; holds the assembly component 3a; unloads the assembly component 3a from the carrier subpallet 1B; and raises the assembly component 3a (working described in this paragraph is of subwork step 2).

Next, the assembling-means-moving mechanism 44-1 is activated and moves the assembling means 40-1 by a predetermined amount in the direction opposite the conveyance direction of the conveying apparatus 30. The predetermined amount is a distance between the component-unloading position, where a component is unloaded from the assembly-component carrier subpallet 1B, and the component-attaching position, where the component is attached to the assembly target object 2 placed on the assembly-target-object carrier subpallet 1A. At this time, the assembly component 3a held by the holding hand 43-1 is positioned immediately above the corresponding attachment position on the assembly target object 2. During this movement, the carrier subpallets 1B, 1A are immovably held at their stop positions (component-unloading position and component-attaching position). Next, the holding hand 43-1 lowers and places the assembly component 3a at the attachment position and activates an attaching jig incorporated therein so as to attach the assembly component 3a to the attachment position. Then, the holding hand 43-1 releases the assembly component 3a and rises back to its original position (working described in this paragraph is of subwork step 3).

In the case where another component to be attached is present on the same X-axis (herein, X-axis 1), in order to unload the next assembly component from the carrier subpallet 1B, the assembling means 40-1 moves to the position of the next assembly component on the carrier subpallet 1B. Subsequently, the assembling means 40-1 carries out an attaching motion similar to that described above, thereby attaching the next assembly component to a corresponding predetermined position on the assembly target object 2. In this manner, the assembling means 40-1 can reciprocally move a plurality of times between the carrier subpallet 1B and the carrier subpallet 1A for attachment of assembly components. After completion of attaching work, the pallet-positioning-holding means 31-1, 32-1 release the carrier subpallet 1B, 1A, respectively, thereby canceling the positioning and holding of the carrier subpallets 1B, 1A.

Through the above-mentioned subwork steps 1 to 3, there is completed the work of attaching the assembly component 3a to the assembly target object 2 at the assembling station of the assembling means 40-1. The assembly-target-object carrier subpallet 1A and the assembly-component carrier subpallet 1B are then conveyed to the assembling station of the next assembling means 40-2 by the conveying apparatus 30. At the assembling station, the assembly components 3b, 3e are attached to the assembly target object 2. Subsequently, similarly, the assembling means 40-3, 40-4 attach the assembly components 3c, 3d, respectively, to the assembly target object 2 at the respective assembling stations.

In the above description, the assembly-target-object carrier subpallet 1A and the assembly-component carrier subpallet 1B are conveyed in a pair by the conveying apparatus 30. However, a plurality of assembly-target-object carrier subpallets and a plurality of assembly-component carrier subpallets may be continuously conveyed. For example, first, three assembly-component carrier subpallets 1B are conveyed; subsequently, one assembly-target-object carrier subpallet 1A is conveyed. Alternatively, first, two assembly-component carrier subpallets 1B are conveyed; subsequently, two assembly-target-object carrier subpallets 1A are conveyed. As for the sequence of conveyance, any carrier subpallet may be conveyed first. These modes for conveyance of the carrier subpallets 1A, 1B are selected as appropriate according to the number of assembly components, the number of assembly target objects, a pattern of arrangement of attachment positions on the assembly target object, etc.

Since the assembly-target-object-and-assembly-component carrier pallet and the assembling apparatus of the present Embodiment 4 are configured as described above, even though each of the assembling means 40-1 to 40-4 involves an additional horizontal movement, by virtue of movement on the same X-axis, the assembling means 40-1 to 40-4 can accurately hold (unload) and attach the assembly components 3a to 3e, thereby maintaining the mechanical error at a reduced level. Further, even small assembly components can be assembled with high accuracy. Effects substantially similar to those yielded in Embodiment 3 can be yielded.

Embodiment 5

Next, a further embodiment (Embodiment 5) of the present invention will be described.

Figure 8:
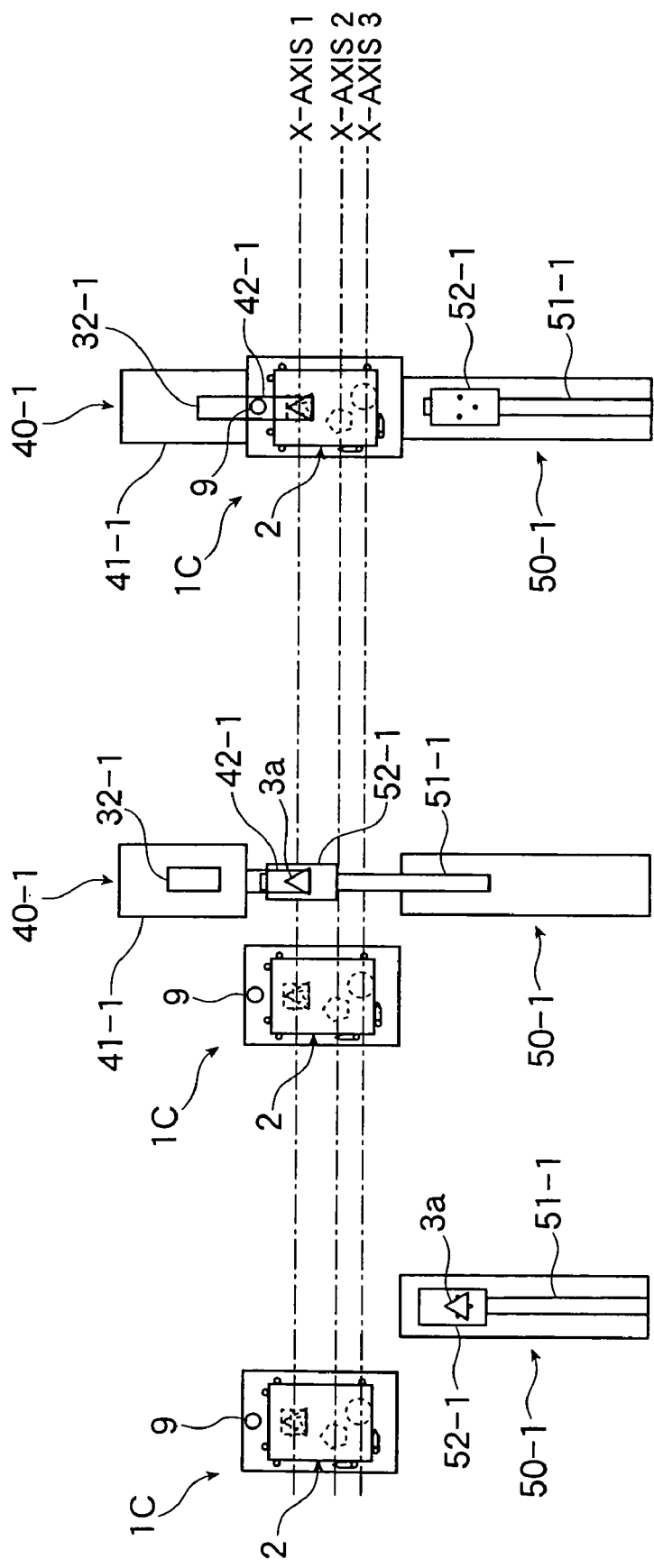
FIG. 8 is a view showing the flow of assembling work carried out by one assembling means which partially constitutes an assembling apparatus including an assembly-target-object carrier pallet according to a further embodiment (Embodiment 5) of the present invention, and corresponding to FIG. 4, which shows Embodiment 1.
Figure 9:
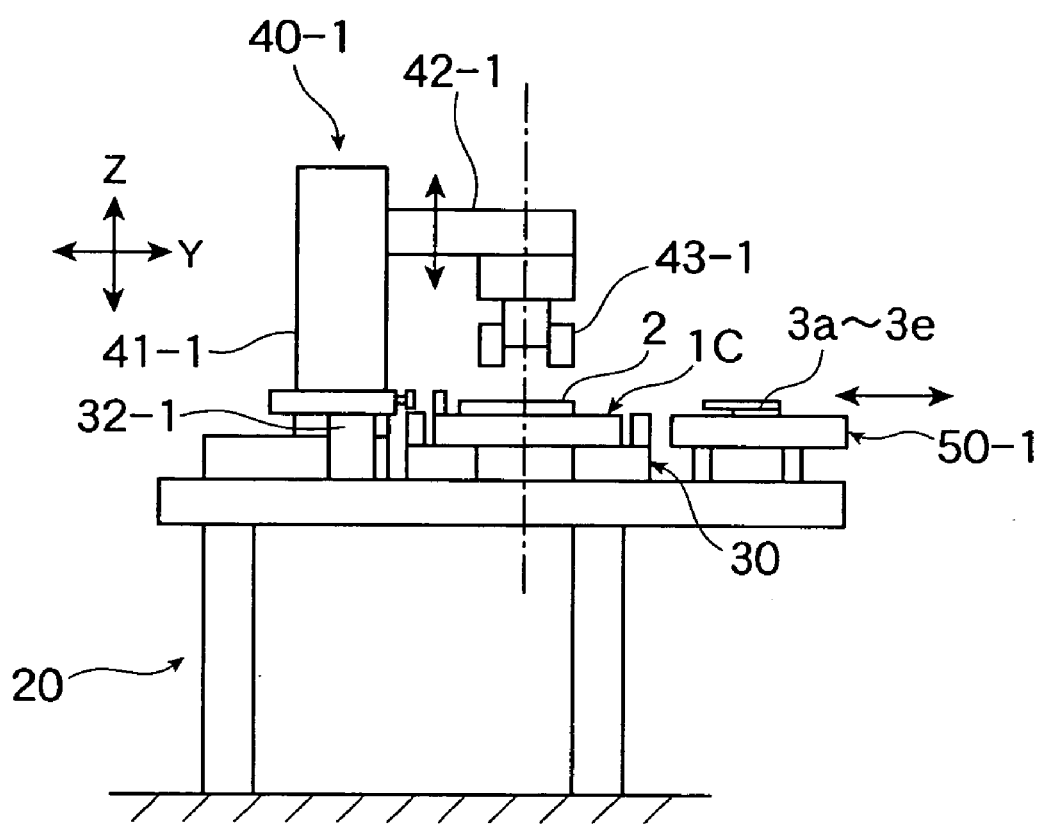
FIG. 9 is a side view of the assembling apparatus of FIG. 8.

FIG. 8 is a view showing the flow of assembling work carried out by one assembling means which partially constitutes an assembling apparatus including an assembly-target-object carrier pallet according to the present Embodiment 5, and corresponding to FIG. 4, which shows Embodiment 1. FIG. 9 is a side view of the assembling apparatus of FIG. 8.

As compared with the assembling apparatus 10 of Embodiments 1 to 4, the assembling apparatus 10 of the present Embodiment 5 is identical in object (problems to be solved) and is substantially identical in effects to be yielded, but differs greatly in configuration.

First, a pallet which the assembling apparatus 10 includes is only an assembly-target-object carrier pallet 1C used to carry thereon the assembly target object 2. The assembling apparatus 10 further includes assembly-component supply means 50-1 to 50-4 used to supply the assembly components 3a to 3e.

The assembly-component supply means 50-1 to 50-4 are independent of a conveyance line of the conveying apparatus 30. The assembly-component supply means 50-1 to 50-4 supply the assembly components 3a to 3e from a direction perpendicular to or substantially perpendicular to the conveyance line at the assembling stations of the assembling means 40-1 to 40-4 as follows. A single or a plurality of assembly components (any one(s) of the assembly components 3a to 3e) to be attached at each of the assembling stations are carried on each of component carrier portions 52-1 to 52-4 located at end portions of sliders 51-1 to 51-4 of the assembly-component supply means 50-1 to 50-4 and are supplied onto the conveyance line of the conveying apparatus 30. The assembly-component supply means 50-1 to 51-4 are installed opposite to the assembling means 40-1 to 40-4, respectively, with respect to the conveyance line. For reciprocally moving the sliders 51-1 to 51-4, known mechanisms, such as air cylinders, oil cylinders, or motors, can be used.

The placement position of the assembly target object 2 on the assembly-target-object carrier pallet 1C and the supply destination positions of the assembly components 3a to 3e supplied by the assembly-component supply means 50-1 to 50-4 are in such a relation that, as viewed in plane, the supply destination position of a predetermined assembly component (any one of the assembly components 3a to 3e) is on a straight line (any one of the X-axis 1 to X-axis 3) which passes through a predetermined attachment position on the assembly target object 2 where the predetermined assembly component is to be attached, and which is oriented in a predetermined direction; i.e., in the direction (X-direction) of conveying the assembly-target-object carrier pallet 1C by the conveying apparatus 30. This positional feature is similar to those of Embodiments 1 to 4 and thus yields an effect similar to that yielded by those of Embodiments 1 to 4.

The conveying apparatus 30 includes the pallet-positioning-holding means 32-1 to 32-4 for positioning and holding the assembly-target-object carrier pallet 1C at respective predetermined stop positions. The predetermined stop position is a position (component-attaching position) where, after each of the assembling means 40-1 to 40-4 unloads, from the corresponding assembly-component supply means among the assembly-component supply means 50-1 to 50-4, the predetermined assembly component (any one of the assembly components 3a to 3e) supplied by the assembly-component supply means and raises the predetermined assembly component, each of the assembling means 40-1 to 40-4 lowers the predetermined assembly component and attaches the predetermined assembly component to the corresponding attachment position on the assembly target object 2.

The movement of each of the assembling means 40-1 to 40-4 from the component-unloading position; i.e., from the supply destination position of each of the assembly components 3a to 3e supplied by the assembly-component supply means 50-1 to 50-4, to the component-attaching position is effected through the conveying apparatus 30 conveying the assembly-target-object carrier pallet 1C in the predetermined direction (X-direction). The assembling means 40-1 to 40-4 are fixed, and merely their arms 42-1 to 42-4 move vertically.

Next will be described in detail with reference to FIG. 8 a specific work step (work step 1; see FIG. 3) in the present Embodiment 5 for attaching the assembly component 3a to the predetermined attachment position on the assembly target object 2 at the assembling station of the assembling means 40-1 among the assembling means 40-1 to 40-4.

The work step 1 (see FIG. 3), which is carried out at the assembling station of the assembling means 40-1, is described below while being divided into three subwork steps 1 to 3 as shown in FIG. 8 as in the case of Embodiments 1 to 4.

First, the assembly-target-object carrier pallet 1C is conveyed from an upstream step to the assembling station of the assembling means 40-1 by the conveying apparatus 30. The assembly-target-object carrier pallet 1C carries thereon the assembly target object 2. The assembly-component supply means 50-1 is on standby (subwork step 1).

Next, the assembly-component supply means 50-1 is activated, and its slider 51-1 moves forward (extends), thereby supplying the assembly component 3a placed on its component carrier portion 52-1 to a predetermined supply destination position on the X-axis 1. At this time, the assembly component 3a is positioned immediately under the holding hand 43-1 of the assembling means 40-1 (see FIG. 9). Next, the holding hand 43-1 lowers; holds the assembly component 3a; unloads the assembly component 3a from the slider 51-1; and raises the assembly component 3a. Then, the slider 51-1 moves backward (retracts) and becomes ready to carry the next assembly component 3a thereon (working described in this paragraph is of subwork step 2).

Next, the conveying apparatus 30 is again activated and moves the carrier pallet 1C by a predetermined amount. By this procedure, an unillustrated carrier pallet detection means (sensor) detects, at a certain position, the carrier pallet 1C, and the conveying apparatus 30 is stopped at that position (component-attaching position). At the same time, the pallet-positioning-holding means 32-1 activates the positioning-holding mechanism incorporated therein, thereby holding the positioning pin 9 of the carrier pallet 1C for positioning and immovably holding the carrier pallet 1C at the component-attaching position. At this time, the assembly component 3a held by the holding hand 43-1 is positioned immediately above the corresponding attachment position on the assembly target object 2. Next, the holding hand 43-1 lowers and places the assembly component 3a at the attachment position and activates an attaching jig incorporated therein so as to attach the assembly component 3a to the attachment position. Then, the holding hand 43-1 releases the assembly component 3a and rises back to its original position. Subsequently, the pallet-positioning-holding means 32-1 releases the carrier pallet 1C, thereby canceling the positioning and holding of the carrier pallet 1C (working described in this paragraph is of subwork step 3).

Through the above-mentioned subwork steps 1 to 3, there is completed the work of attaching the assembly component 3a to the assembly target object 2 at the assembling station of the assembling means 40-1. The assembly-target-object carrier pallet 1C is then conveyed to the assembling station of the next assembling means 40-2 by the conveying apparatus 30. At the assembling station, the assembly components 3b, 3e are attached to the assembly target object 2. In this case, the assembly components 3b, 3e are placed on the component carrier portion 52-2 of the slider 51-2 of the assembly-component supply means 50-2 in such a manner as to be juxtaposed in the longitudinal direction of the slider 51-2 and are supplied onto the conveyance line of the conveying apparatus 30. Subsequently, similarly, the assembling means 40-3, 40-4 attach the assembly components 3c, 3d, respectively, to the assembly target object 2 at the respective assembling stations.

Embodiment 6

Next, a further embodiment (Embodiment 6) of the present invention will be described.

Figure 10:
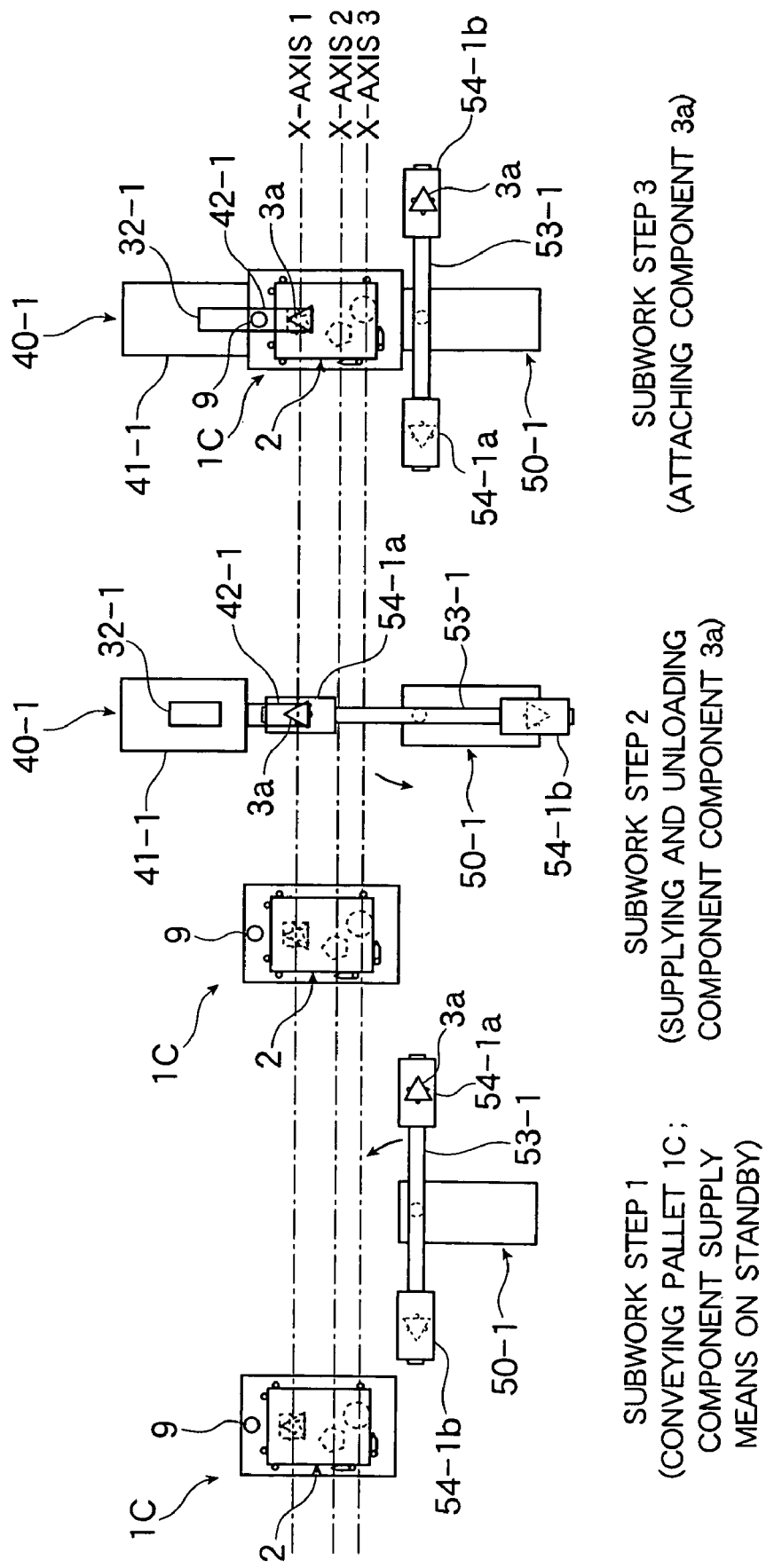
FIG. 10 is a view showing the flow of assembling work carried out by one assembling means which partially constitutes an assembling apparatus according to a further embodiment (Embodiment 6) of the present invention, and corresponding to FIG. 8, which shows Embodiment 5.

FIG. 10 is a view showing the flow of assembling work carried out by one assembling means which partially constitutes an assembling apparatus according to the present Embodiment 6, and corresponding to FIG. 8, which shows Embodiment 5.

The assembling apparatus 10 of the present Embodiment 6 differs from the assembling apparatus 10 of Embodiment 5 only in the configuration of the assembly-component supply means 50-1 to 50-4. Specifically, the assembly-component supply means 50-1 to 50-4 in the assembling apparatus 10 of the present Embodiment 6 include swivel bars 53-1 to 53-4, respectively, in place of the sliders 51-1 to 51-4 which the assembly-component supply means 50-1 to 50-4 in the assembling apparatus 10 of Embodiment 5 include respectively.

As shown in FIG. 10, the swivel bars 53-1 to 53-4 have, at their opposite ends, component carrier portions 54-1a, 54-1b to 54-4a, 54-4b, respectively. Center portions of the swivel bars 53-1 to 53-4 are pivotably supported by end portions of the assembly-component supply means 50-1 to 50-4, respectively. A single or a plurality of assembly components (any one(s) of the assembly components 3a to 3e) to be attached at each of the assembling stations of the assembling means 40-1 to 40-4 are carried on each of the component carrier portions 54-1a, 54-1b to 54-4a, 54-4b. The swivel bar swivels intermittently by predetermined angles; in the present Embodiment 6, by 90 degrees, in a horizontal plane so as to supply the assembly component one piece at a time onto the conveyance line of the conveying apparatus 30.

The component carrier portion which has become vacant as a result of supply of an assembly component(s) onto the conveyance line of the conveying apparatus 30 is sequentially replenished with the same assembly component(s). This replenishment of an assembly component(s) may be carried out while, in the subwork step 3, each of the holding hands 43-1 to 43-4 is attaching an assembly component (any one of the assembly components 3a to 3e; in FIG. 10, the assembly component 3a) to a corresponding attachment position on the assembly target object 2 or while, in the subwork step 2, each of the holding hands 43-1 to 43-4 lowers, and holds and unloads the next assembly component (any one of the assembly components 3a to 3e; in FIG. 10, the assembly component 3a).

Since the assembly-target-object carrier pallet and the assembling apparatus of the present Embodiment 6 are configured as described above, effects similar to those yielded in Embodiment 1 are yielded. Particularly, since the assembly-component supply means 50-1 to 50-4 include the respective swivel bars 53-1 to 53-4 having, at their opposite ends, the respective component carrier portions 54-1a, 54-1b to 54-4a, 54-4b, and each of the swivel bars 53-1 to 53-4 swivels intermittently by predetermined angles in a horizontal plane so as to supply to the conveyance line of the conveying apparatus 30 the assembly component (any of the assembly components 3a to 3e) at least one piece at a time, the motion of the assembly-component supply means 50-1 to 50-4 is merely a unidirectional motion along the swiveling direction of the swivel bars 53-1 to 53-4, so that the structure and control of the assembly-component supply means 50-1 to 50-4 can be simplified.

Embodiment 7

Next, a further embodiment (Embodiment 7) of the present invention will be described.

FIG. 11 is a view showing the flow of assembling work carried out by one assembling means which partially constitutes an assembling apparatus according to the present Embodiment 7, and corresponding to FIG. 8, which shows Embodiment 5.

The assembling apparatus 10 of the present Embodiment 7 differs from the assembling apparatus 10 of Embodiment 5 in that the assembling means 40-1 to 40-4 include the assembling-means-moving mechanisms 44-1 to 44-4, respectively.

This structural feature of the assembling apparatus 10 of the present Embodiment 7 facilitates the following operation: a plurality of assembly components are juxtaposed along the X-axis on each of the component carrier portions 52-1 to 52-4 located at end portions of the sliders 51-1 to 51-4 of the assembly-component supply means 50-1 to 50-4; are supplied onto the conveyance line; and are attached to the assembly target object 2 at a single assembling station of the assembling means.

In this case, the placement position of the assembly target object 2 on the assembly-target-object carrier pallet 1C and the supply destination positions on the conveyance line of the assembly components supplied by each of the assembly-component supply means 50-1 to 50-4 are in such a relation that, as viewed in plane, the supply destination positions of predetermined assembly components (any two or more of the assembly components 3a to 3e; the case of one assembly component is not excluded) supplied by the assembly-component supply means are on a common straight line (X-axis 1 for the assembly components 3a, 3b supplied by the assembly-component supply means 50-1 at the assembling station of the assembling means 40-1 shown in FIG. 11) which passes through a predetermined attachment position on the assembly target object where the predetermined assembly components are to be attached, and which is oriented in a predetermined direction. The "predetermined direction" is the conveyance direction of the conveying apparatus 30 (X-direction).

The placement position of the assembly target object 2 on the assembly-target-object carrier pallet 1C and the supply destination positions on the conveyance line of a plurality of assembly components supplied by each of the assembly-component supply means 50-1 to 50-4 are in the above-mentioned relation. Thus, two or more assembly components supplied by any one of the assembly-component supply means can be transferred to the attachment position as follows: the assembling means reciprocally moves at a plurality of times along the common straight line from the supply destination positions of the assembly components (unloading positions of the assembly components) to a predetermined stop position of the assembly-target-object carrier pallet 1C (attachment position of the assembly components). Thus, work efficiency can be further improved.

A work step (which corresponds to the work step 1 and a portion of the work step 2 in FIG. 3) which is carried out in the present Embodiment 7 at the assembling station of the assembling means 40-1 among the assembling means 40-1 to 40-4 is described below while being divided into five subwork steps 1 to 5.

First, the assembly-target-object carrier pallet 1C is conveyed from an upstream step to the assembling station of the assembling means 40-1 by the conveying apparatus 30. The assembly-target-object carrier pallet 1C carries thereon the assembly target object 2. The assembly-component supply means 50-1 is on standby (subwork step 1).

Next, when unillustrated carrier pallet detection means (sensor) detects, at a certain position, the carrier pallet 1C, the conveying apparatus 30 is stopped at that position (component-attaching position). At the same time, the pallet-positioning-holding means 32-1 activates the positioning-holding mechanism incorporated therein, thereby holding the positioning pin 9 of the carrier pallet 1C for positioning and immovably holding the carrier pallet 1C at the component-attaching position. At the same time, the assembly-component supply means 50-1 is activated, and its slider 51-1 moves forward (extends), thereby supplying the assembly components 3a, 3b placed on its component carrier portion 52-1 to a predetermined supply destination position on the X-axis 1. At this time, the assembly component 3a is positioned immediately under the holding hand 43-1 of the assembling means 40-1 (see FIG. 9). Next, the holding hand 43-1 lowers; holds the assembly component 3a; unloads the assembly component 3a from the slider 51-1; and raises the assembly component 3a (working described in this paragraph is of subwork step 2).

Next, the assembling-means-moving mechanism 44-1 is activated and moves the assembling means 40-1 by a predetermined amount in the direction opposite the conveyance direction of the conveying apparatus 30. At this time, the assembly component 3a held by the holding hand 43-1 is positioned immediately above the corresponding attachment position on the assembly target object 2. During this movement, the slider 51-1 is immovably held at the above-mentioned position (component supply destination position). Next, the holding hand 43-1 lowers and places the assembly component 3a at the attachment position and activates an attaching jig incorporated therein so as to attach the assembly component 3a to the attachment position. Then, the holding hand 43-1 releases the assembly component 3a and rises, and the assembling-means-moving mechanism 44-1 is activated and moves the assembling means 40-1 back to the position of the assembly component 3b placed on the component carrier portion 52-1 (working described in this paragraph is of subwork step 3).

Next, the holding hand 43-1 lowers; holds the assembly component 3b; unloads the assembly component 3b from the slider 51-1; and raises the assembly component 3b (subwork step 4).

The holding hand 43-1 is configured to have a function suited for holding and attaching the assembly components 3a, 3b.

Next, the assembling-means-moving mechanism 44-1 is activated and moves the assembling means 40-1 by a predetermined amount in the direction opposite the conveyance direction of the conveying apparatus 30. At this time, the assembly component 3b held by the holding hand 43-1 is positioned immediately above the corresponding attachment position on the assembly target object 2. During this movement, the slider 51-1 moves backward (retracts) from the component supply destination position to the standby position and becomes ready to carry the next assembly components 3a, 3b on the component carrier portion 52-1.

In the present Embodiment 7, the assembly components 3a, 3b are attached to the same attachment position. Thus, the above-mentioned two "predetermined amounts" are the same amount. However, in the case where the assembly components 3a, 3b are attached to different attachment positions, the two "predetermined amounts" (amounts of movement of the assembling means 40-1 along the X-axis 1 for attaching the two assembly components) differ from each other.

Next, the holding hand 43-1 lowers and places the assembly component 3b at the attachment position and activates the attaching jig incorporated therein so as to attach the assembly component 3b to the attachment position. Then, the holding hand 43-1 releases the assembly component 3b and rises, and the assembling-means-moving mechanism 44-1 is activated and moves the assembling means 40-1 back to its original position. Subsequently, the pallet-positioning-holding means 32-1 releases the carrier pallet 1C, thereby canceling the positioning and holding of the carrier pallet 1C (working described in this paragraph is of subwork step 5).

Through the above-mentioned subwork steps 1 to 5, there is completed the work of attaching the assembly components 3a, 3b to the assembly target object 2 at the assembling station of the assembling means 40-1. The assembly-target-object carrier pallet 1C is then conveyed to the assembling station of the next assembling means 40-2 by the conveying apparatus 30. At the assembling station, the assembly component 3e is attached to the assembly target object 2. Subsequently, similarly, the assembling means 40-3, 40-4 attach the assembly components 3c, 3d, respectively, to the assembly target object 2 at the respective assembling stations.

In the present Embodiment 7, at the assembling stations of the assembling means 40-2 to 40-4, attaching work is carried out for merely one assembly component; namely, the assembling components 3e, 3c, 3d, respectively. However, when there arises the need to attach more assembly components on the X-axis 2, X-axis 3, X-axis 4 . . . , the assembling apparatus 10 of the present Embodiment 7 yields particularly marked effects.

The present invention is not limited to the above embodiments and can be modified in various other forms, so long as such modifications do not depart from the spirit of the invention, particularly, so long as a component attachment position on the assembly target object and the unloading position of an assembly component to be attached to the component attachment position are located on the same X-axis.

The invention claimed is:

1. An assembling apparatus for attaching a plurality of predetermined assembly components to an assembly target object at predetermined attachment positions, the assembling apparatus comprising:
   a slider driven in a predetermined conveying direction;
   a pallet which is provided on the slider and on which the assembly target object and the plurality of assembly components are arranged such that each of the assembly components and its corresponding attachment position are located on a straight line parallel to the predetermined conveying direction;
   at least one assembling means having an arm which is vertically movable, the assembling means unloading the predetermined assembly components from the pallet and attaching the predetermined assembly components to the predetermined attachment positions on the assembly target object; and
   a control apparatus for controlling the drive of the slider in the predetermined conveying direction,
   wherein the pallet is conveyed and positioned at predetermined positions in the predetermined conveying direction by the slider and the control apparatus.

2. The assembling apparatus according to claim 1, wherein the pallet is composed of a single pallet; and both the assembly target object and the plurality of assembly components are placed on the single pallet.

3. The assembling apparatus according to claim 1, wherein the pallet is composed of two separated subpallets; and the assembly target object is placed on one subpallet, and the plurality of assembly components are placed on the other subpallet.

4. The assembling apparatus according to claim 1, further comprising an assembling-means-moving mechanism for freely moving the arm along the predetermined conveying direction, wherein the assembling-means-moving mechanism is configured such that, when the pallet is stopped, the assembling-means-moving mechanism moves the arm from a position where the arm unloads one of the predetermined assembly components from the pallet and raises the unloaded assembly component to a position where the arm lowers the unloaded, raised assembly component and attaches the assembly component to the corresponding attachment position on the assembly target object.

* * * * *